(12) United States Patent (10) Patent No.: US 8,929,908 B2
Agrawal et al. (45) Date of Patent: Jan. 6, 2015

(54) METHOD AND APPARATUS FOR ESTIMATING REVERSE LINK LOADING IN A WIRELESS COMMUNICATION SYSTEM

(75) Inventors: Avneesh Agrawal, San Diego, CA (US); Dmitry R. Milikovsky, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1150 days.

(21) Appl. No.: 11/553,955

(22) Filed: Oct. 27, 2006

(65) Prior Publication Data

US 2007/0270100 A1 Nov. 22, 2007

Related U.S. Application Data

(60) Provisional application No. 60/731,132, filed on Oct. 27, 2005, provisional application No. 60/731,013, filed on Oct. 27, 2005.

(51) Int. Cl.
*H04W 72/00* (2009.01)
*H04B 17/00* (2006.01)

(52) U.S. Cl.
CPC .......... *H04B 17/005* (2013.01); *H04B 17/0077* (2013.01)
USPC .......................................... 455/453; 455/63.1

(58) Field of Classification Search
USPC ............ 455/69, 522, 456.1, 423, 67.1, 115.1, 455/226.1, 443; 370/208, 335, 203
See application file for complete search history.

(56) References Cited

U.S. PATENT DOCUMENTS 3,577,080 A 5/1971 Cannalte
4,225,976 A 9/1980 Osborne et al.
(Continued)

FOREIGN PATENT DOCUMENTS

CA 2340201 A1 1/2001
CA 2635291 A1 10/2007
(Continued)

OTHER PUBLICATIONS

International Search Report, PCT/US06/042060, International Search Authority, European Patent Office, Jun. 27, 2007.

(Continued)

*Primary Examiner* — Tu X Nguyen
(74) *Attorney, Agent, or Firm* — Charles E. Eggers

(57) ABSTRACT

Method and apparatus for estimating reverse link loading in a wireless communication system. The reverse link interference is measured and reverse link receiver noise is measured. The reverse link interference is compared to the reverse link receiver noise, for example, by dividing the interference power by the receiver noise power. The reverse link receiver noise can be measured in an orthogonal frequency division multiple access (OFDMA) system by nulling transmission from access terminals within the cell and nearby during a null time and frequency interval. Power measure in the null time and frequency interval is receiver noise power. The reverse link interference can be measure by several means. For example, local null time and frequency intervals can be designated. The access terminals within the cell null their transmissions during the local time and frequency intervals. Access terminals outside the cell continue to transmit during the local time and frequency intervals. Power measured in the local time and frequency interval is interference power. As another example, interference power can be measured by subtracting pairs of pilot symbols that are contiguous to each other in time or frequency.

30 Claims, 12 Drawing Sheets

(56) References Cited

U.S. PATENT DOCUMENTS

| | | |
|---|---|---|
| 4,539,684 A | 9/1985 | Kloker |
| 4,638,479 A | 1/1987 | Alexis |
| 4,901,307 A | 2/1990 | Gilhousen et al. |
| 4,908,827 A | 3/1990 | Gates |
| 5,103,459 A | 4/1992 | Gilhousen et al. |
| 5,267,262 A | 11/1993 | Wheatley, III |
| 5,301,364 A | 4/1994 | Arens et al. |
| 5,396,516 A | 3/1995 | Padovani et al. |
| 5,406,613 A | 4/1995 | Peponides et al. |
| 5,448,600 A | 9/1995 | Lucas |
| 5,469,471 A | 11/1995 | Wheatley, III |
| 5,548,812 A | 8/1996 | Padovani et al. |
| 5,559,790 A | 9/1996 | Yano et al. |
| 5,574,984 A | 11/1996 | Reed et al. |
| 5,606,727 A | 2/1997 | Ueda |
| 5,722,063 A | 2/1998 | Peterzell et al. |
| 5,734,646 A | 3/1998 | I et al. |
| 5,754,533 A | 5/1998 | Bender et al. |
| 5,774,785 A | 6/1998 | Karlsson |
| 5,784,363 A | 7/1998 | Engstrom et al. |
| 5,815,507 A | 9/1998 | Vinggaard et al. |
| 5,839,056 A | 11/1998 | Hakkinen |
| 5,859,383 A | 1/1999 | Davison et al. |
| 5,933,768 A | 8/1999 | Skold et al. |
| 5,956,642 A | 9/1999 | Larsson et al. |
| 5,961,588 A | 10/1999 | Cooper et al. |
| 5,995,488 A | 11/1999 | Kalkunte et al. |
| 5,996,103 A | 11/1999 | Jahanghir |
| 5,996,110 A | 11/1999 | Kosmach |
| 6,006,073 A | 12/1999 | Glauner et al. |
| 6,012,160 A | 1/2000 | Dent |
| 6,038,220 A | 3/2000 | Kang et al. |
| 6,044,072 A | 3/2000 | Ueda |
| 6,047,189 A | 4/2000 | Yun et al. |
| 6,061,339 A | 5/2000 | Nieczyporowicz et al. |
| 6,075,974 A | 6/2000 | Saints et al. |
| 6,101,179 A | 8/2000 | Soliman |
| 6,112,325 A | 8/2000 | Burshtein |
| 6,144,841 A | 11/2000 | Feeney |
| 6,154,659 A | 11/2000 | Jalali et al. |
| 6,173,162 B1 | 1/2001 | Dahlman et al. |
| 6,173,187 B1 | 1/2001 | Salonaho et al. |
| 6,173,188 B1 | 1/2001 | Kim |
| 6,175,587 B1 | 1/2001 | Madhow et al. |
| 6,175,588 B1 | 1/2001 | Visotsky et al. |
| 6,181,738 B1 | 1/2001 | Chheda et al. |
| 6,188,678 B1 | 2/2001 | Prescott |
| 6,192,249 B1 * | 2/2001 | Padovani ............... 455/453 |
| 6,208,699 B1 | 3/2001 | Chen et al. |
| 6,212,364 B1 | 4/2001 | Park |
| 6,216,006 B1 | 4/2001 | Scholefield et al. |
| 6,226,529 B1 | 5/2001 | Bruno et al. |
| 6,233,222 B1 | 5/2001 | Wallentin |
| 6,397,070 B1 | 5/2002 | Black |
| 6,405,043 B1 | 6/2002 | Jensen et al. |
| 6,446,236 B1 | 9/2002 | McEwen et al. |
| 6,449,463 B1 | 9/2002 | Schiff |
| 6,519,705 B1 | 2/2003 | Leung |
| 6,532,563 B2 | 3/2003 | Nobelen |
| 6,539,065 B1 * | 3/2003 | Furukawa ............... 375/316 |
| 6,553,231 B1 * | 4/2003 | Karlsson et al. ......... 455/436 |
| 6,560,744 B1 | 5/2003 | Burshtein |
| 6,560,774 B1 | 5/2003 | Gordon et al. |
| 6,574,211 B2 | 6/2003 | Padovani et al. |
| 6,597,705 B1 | 7/2003 | Rezaiifar et al. |
| 6,597,923 B1 | 7/2003 | Vanghi et al. |
| 6,597,932 B2 | 7/2003 | Tian et al. |
| 6,603,746 B1 | 8/2003 | Larijani et al. |
| 6,611,507 B1 | 8/2003 | Hottinen et al. |
| 6,621,454 B1 * | 9/2003 | Reudink et al. ......... 342/367 |
| 6,643,520 B1 | 11/2003 | Park et al. |
| 6,697,634 B1 | 2/2004 | Hayashi |
| 6,711,150 B1 | 3/2004 | Vanghi |
| 6,711,515 B1 | 3/2004 | Lehtinen et al. |
| 6,717,976 B1 | 4/2004 | Shen |
| 6,721,373 B1 | 4/2004 | Frenkel et al. |
| 6,744,743 B2 | 6/2004 | Walton et al. |
| 6,745,045 B2 | 6/2004 | Terry et al. |
| 6,751,444 B1 | 6/2004 | Meiyappan |
| 6,763,244 B2 | 7/2004 | Chen et al. |
| 6,801,515 B1 | 10/2004 | Ishikawa et al. |
| 6,801,759 B1 | 10/2004 | Saifuddin |
| 6,807,164 B1 | 10/2004 | Almgren et al. |
| 6,895,245 B2 | 5/2005 | Wallentin |
| 6,950,669 B2 | 9/2005 | Simonsson |
| 6,952,591 B2 | 10/2005 | Budka et al. |
| 6,968,201 B1 | 11/2005 | Gandhi et al. |
| 6,977,912 B1 | 12/2005 | Porter et al. |
| 7,012,912 B2 | 3/2006 | Naguib et al. |
| 7,054,275 B2 * | 5/2006 | Kim et al. ............... 370/252 |
| 7,058,421 B2 | 6/2006 | Ngai et al. |
| 7,062,288 B2 | 6/2006 | Raaf et al. |
| 7,072,315 B1 | 7/2006 | Liu et al. |
| 7,103,316 B1 | 9/2006 | Hall |
| 7,145,935 B2 * | 12/2006 | Won et al. ............... 375/144 |
| 7,158,450 B2 | 1/2007 | Wada et al. |
| 7,158,504 B2 | 1/2007 | Kadaba et al. |
| 7,181,170 B2 | 2/2007 | Love et al. |
| 7,184,381 B2 | 2/2007 | Ohkubo et al. |
| 7,197,692 B2 | 3/2007 | Sutivong et al. |
| 7,215,653 B2 | 5/2007 | Kim et al. |
| 7,224,993 B2 | 5/2007 | Meyers et al. |
| 7,254,158 B2 | 8/2007 | Agrawal |
| 7,269,152 B2 | 9/2007 | Vukovic et al. |
| 7,302,276 B2 | 11/2007 | Bernhardsson et al. |
| 7,310,526 B2 | 12/2007 | Sang et al. |
| 7,324,785 B2 | 1/2008 | Hansen et al. |
| 7,349,667 B2 * | 3/2008 | Magee et al. ............ 455/63.4 |
| 7,359,727 B2 | 4/2008 | Tsien et al. |
| 7,359,838 B2 | 4/2008 | Marro et al. |
| 7,363,039 B2 | 4/2008 | Laroia et al. |
| 7,400,887 B2 | 7/2008 | Azman et al. |
| 7,418,241 B2 | 8/2008 | Bao et al. |
| 7,420,939 B2 | 9/2008 | Laroia et al. |
| 7,477,920 B2 | 1/2009 | Scheinert et al. |
| 7,512,412 B2 | 3/2009 | Mese et al. |
| 7,536,626 B2 | 5/2009 | Sutivong et al. |
| 7,551,637 B2 | 6/2009 | Damnjanovic et al. |
| 7,594,151 B2 | 9/2009 | Sutivong et al. |
| 7,639,943 B1 | 12/2009 | Kalajan |
| 7,808,895 B2 | 10/2010 | Nalawadi et al. |
| 7,962,826 B2 | 6/2011 | Sutivong et al. |
| 7,965,789 B2 | 6/2011 | Khandekar et al. |
| 8,095,166 B2 | 1/2012 | Sampath et al. |
| 8,116,800 B2 | 2/2012 | Gorokhov et al. |
| 8,150,448 B2 | 4/2012 | Farnsworth et al. |
| 8,159,928 B2 | 4/2012 | Gorokhov et al. |
| 8,442,572 B2 | 5/2013 | Borran et al. |
| 8,452,316 B2 | 5/2013 | Sutivong et al. |
| 2001/0040880 A1 | 11/2001 | Chen et al. |
| 2001/0055968 A1 | 12/2001 | Yoshida et al. |
| 2002/0018446 A1 | 2/2002 | Huh et al. |
| 2002/0077138 A1 | 6/2002 | Bark et al. |
| 2002/0077985 A1 | 6/2002 | Kobata et al. |
| 2002/0102984 A1 | 8/2002 | Furuskar et al. |
| 2002/0102985 A1 | 8/2002 | Amalfitano et al. |
| 2002/0141349 A1 * | 10/2002 | Kim et al. ............... 370/252 |
| 2002/0145968 A1 | 10/2002 | Zhang et al. |
| 2002/0167907 A1 | 11/2002 | Sarkar et al. |
| 2002/0187801 A1 | 12/2002 | Vanghi |
| 2002/0196766 A1 | 12/2002 | Hwang et al. |
| 2003/0012425 A1 | 1/2003 | Suzuki et al. |
| 2003/0013451 A1 | 1/2003 | Walton |
| 2003/0016770 A1 | 1/2003 | Trans et al. |
| 2003/0069014 A1 | 4/2003 | Raffel et al. |
| 2003/0081538 A1 | 5/2003 | Walton et al. |
| 2003/0086371 A1 | 5/2003 | Walton et al. |
| 2003/0128705 A1 | 7/2003 | Yi et al. |
| 2003/0185159 A1 | 10/2003 | Seo et al. |
| 2003/0185285 A1 * | 10/2003 | Talwar ..................... 375/148 |
| 2004/0038699 A1 | 2/2004 | Toono |
| 2004/0062192 A1 | 4/2004 | Liu et al. |
| 2004/0077370 A1 | 4/2004 | Dick et al. |
| 2004/0081121 A1 * | 4/2004 | Xu ........................... 370/329 |

(56) References Cited

U.S. PATENT DOCUMENTS

| | | |
|---|---|---|
| 2004/0095880 A1 | 5/2004 | Laroia et al. |
| 2004/0109432 A1 | 6/2004 | Laroia et al. |
| 2004/0151109 A1* | 8/2004 | Batra et al. ............... 370/208 |
| 2004/0166886 A1* | 8/2004 | Laroia et al. .............. 455/522 |
| 2004/0166887 A1* | 8/2004 | Laroia et al. .............. 455/522 |
| 2004/0166900 A1 | 8/2004 | Qiu et al. |
| 2004/0218567 A1 | 11/2004 | Budka et al. |
| 2005/0002324 A1 | 1/2005 | Sutivong et al. |
| 2005/0013283 A1* | 1/2005 | Yoon et al. ............... 370/350 |
| 2005/0026624 A1* | 2/2005 | Gandhi et al. ............ 455/453 |
| 2005/0037796 A1 | 2/2005 | Tsai et al. |
| 2005/0096061 A1 | 5/2005 | Ji et al. |
| 2005/0113106 A1 | 5/2005 | Duan et al. |
| 2005/0135457 A1* | 6/2005 | Molisch et al. ........... 375/130 |
| 2005/0147063 A1 | 7/2005 | Pi et al. |
| 2005/0153690 A1 | 7/2005 | Marinier et al. |
| 2005/0176455 A1 | 8/2005 | Krishnan et al. |
| 2005/0192042 A1 | 9/2005 | Au et al. |
| 2005/0276248 A1 | 12/2005 | Butala et al. |
| 2006/0009226 A1 | 1/2006 | Vicharelli et al. |
| 2006/0019496 A1 | 1/2006 | Onishi et al. |
| 2006/0019694 A1 | 1/2006 | Sutivong et al. |
| 2006/0025158 A1 | 2/2006 | Leblanc et al. |
| 2006/0034173 A1 | 2/2006 | Teague et al. |
| 2006/0083161 A1 | 4/2006 | Laroia et al. |
| 2006/0089154 A1 | 4/2006 | Laroia et al. |
| 2006/0105796 A1* | 5/2006 | Malladi et al. ........... 455/522 |
| 2006/0135080 A1 | 6/2006 | Khandekar et al. |
| 2006/0135169 A1 | 6/2006 | Sampath et al. |
| 2006/0164993 A1 | 7/2006 | Teague et al. |
| 2006/0165650 A1 | 7/2006 | Pavone et al. |
| 2006/0171326 A1 | 8/2006 | Durand et al. |
| 2006/0187885 A1 | 8/2006 | Roy et al. |
| 2006/0189344 A1 | 8/2006 | Umesh et al. |
| 2006/0209721 A1 | 9/2006 | Mese et al. |
| 2006/0211441 A1 | 9/2006 | Mese et al. |
| 2006/0234752 A1 | 10/2006 | Mese et al. |
| 2006/0262868 A1* | 11/2006 | Leshem ................... 375/260 |
| 2006/0285503 A1 | 12/2006 | Mese et al. |
| 2007/0030827 A1 | 2/2007 | Rui et al. |
| 2007/0081491 A1 | 4/2007 | Kim et al. |
| 2007/0150799 A1 | 6/2007 | Sutivong et al. |
| 2007/0161385 A1 | 7/2007 | Anderson |
| 2007/0249363 A1 | 10/2007 | Amalfitano et al. |
| 2007/0258525 A1 | 11/2007 | Jacobsen et al. |
| 2007/0274257 A1 | 11/2007 | Bae et al. |
| 2007/0280170 A1 | 12/2007 | Kawasaki |
| 2007/0286105 A1 | 12/2007 | Kim et al. |
| 2007/0286128 A1 | 12/2007 | Bae et al. |
| 2008/0014980 A1 | 1/2008 | Yano et al. |
| 2008/0031380 A1 | 2/2008 | Takabayashi |
| 2008/0037439 A1 | 2/2008 | Cave et al. |
| 2008/0039129 A1 | 2/2008 | Li et al. |
| 2008/0043880 A1 | 2/2008 | Matsushita |
| 2008/0045260 A1 | 2/2008 | Muharemovic et al. |
| 2008/0056181 A1 | 3/2008 | Imamura et al. |
| 2008/0062956 A1 | 3/2008 | Kuroda et al. |
| 2008/0117833 A1 | 5/2008 | Borran et al. |
| 2008/0117849 A1 | 5/2008 | Borran et al. |
| 2008/0161033 A1 | 7/2008 | Borran et al. |
| 2008/0165675 A1 | 7/2008 | Yang et al. |
| 2008/0166976 A1 | 7/2008 | Rao |
| 2008/0214121 A1 | 9/2008 | Sutivong et al. |
| 2008/0267067 A1 | 10/2008 | Salazar et al. |
| 2008/0291856 A1 | 11/2008 | Li et al. |
| 2009/0023466 A1 | 1/2009 | Sutivong et al. |
| 2009/0082052 A1 | 3/2009 | Bhushan et al. |
| 2009/0109939 A1 | 4/2009 | Bhushan et al. |
| 2009/0117931 A1 | 5/2009 | Shin et al. |
| 2010/0027451 A1 | 2/2010 | Khandekar et al. |
| 2010/0061243 A1 | 3/2010 | Yi et al. |
| 2011/0105111 A1 | 5/2011 | Plestid et al. |
| 2011/0223957 A1 | 9/2011 | Pietraski |
| 2011/0282999 A1 | 11/2011 | Teague et al. |
| 2011/0296279 A1 | 12/2011 | Sutivong et al. |
| 2012/0083302 A1 | 4/2012 | Borran et al. |
| 2012/0270582 A1 | 10/2012 | Mese et al. |
| 2013/0107740 A1 | 5/2013 | Mese et al. |
| 2013/0237262 A1 | 9/2013 | Borran et al. |

FOREIGN PATENT DOCUMENTS

| | | |
|---|---|---|
| CL | 199500144 | 12/1995 |
| CL | 184195 | 7/1996 |
| CL | 199701119 | 3/1998 |
| CL | 199800442 | 11/1998 |
| CL | 33582005 | 12/2006 |
| CL | 04992006 | 2/2007 |
| CL | 05752006 | 2/2007 |
| CN | 1190848 | 8/1998 |
| CN | 1250342 | 4/2000 |
| CN | 1292981 A | 4/2001 |
| EP | 0668662 A1 | 8/1995 |
| EP | 0673125 A1 | 9/1995 |
| EP | 0715423 | 6/1996 |
| EP | 0767548 | 4/1997 |
| EP | 0889663 A1 | 1/1999 |
| EP | 0955736 A2 | 11/1999 |
| EP | 1175056 A1 | 1/2002 |
| EP | 1315310 A2 | 5/2003 |
| EP | 1320276 A2 | 6/2003 |
| EP | 1515475 A1 | 3/2005 |
| GB | 2378858 | 2/2003 |
| JP | H1032605 A | 2/1998 |
| JP | 2000040999 A | 2/2000 |
| JP | 2000502218 T | 2/2000 |
| JP | 2000504529 | 4/2000 |
| JP | 2001044926 | 2/2001 |
| JP | 2001274748 | 10/2001 |
| JP | 2001285193 | 10/2001 |
| JP | 2001518767 A | 10/2001 |
| JP | 2001519618 | 10/2001 |
| JP | 2001358649 A | 12/2001 |
| JP | 2002026747 A | 1/2002 |
| JP | 2002501353 A | 1/2002 |
| JP | 2002506334 T2 | 2/2002 |
| JP | 2002077985 A | 3/2002 |
| JP | 2003032218 | 1/2003 |
| JP | 2003505973 | 2/2003 |
| JP | 2003510950 A | 3/2003 |
| JP | 2003318818 A | 11/2003 |
| JP | 2004503126 A | 1/2004 |
| JP | 2004064142 A | 2/2004 |
| JP | 2004080340 A | 3/2004 |
| JP | 2004104293 | 4/2004 |
| JP | 2004214914 A | 7/2004 |
| JP | 2004253899 A | 9/2004 |
| JP | 2004260467 A2 | 9/2004 |
| JP | 2004533188 | 10/2004 |
| JP | 2005501444 A | 1/2005 |
| JP | 2005502218 A | 1/2005 |
| JP | 2005505954 A | 2/2005 |
| JP | 2005065182 A | 3/2005 |
| JP | 2005348433 A | 12/2005 |
| JP | 2005537691 | 12/2005 |
| JP | 2005538650 | 12/2005 |
| JP | 2006141038 A | 6/2006 |
| JP | 2006222560 A | 8/2006 |
| JP | 2007518361 A | 7/2007 |
| JP | 2008503925 | 2/2008 |
| JP | 2008526136 A | 7/2008 |
| JP | 2008533924 | 8/2008 |
| JP | 4522634 | 6/2010 |
| JP | 2010200474 | 9/2010 |
| KR | 100262027 B1 | 7/2000 |
| KR | 200228664 | 4/2002 |
| KR | 20030004985 A | 1/2003 |
| KR | 20030024442 | 3/2003 |
| KR | 200427165 | 4/2004 |
| KR | 20040088982 A | 10/2004 |
| RU | 2001531 C1 | 10/1993 |
| RU | 2120183 C1 | 10/1998 |
| RU | 2163053 C2 | 2/2001 |
| RU | 2198465 C2 | 9/2002 |

(56) References Cited

FOREIGN PATENT DOCUMENTS

| | | |
|---|---|---|
| RU | 2214680 C2 | 10/2003 |
| RU | 2214690 C2 | 10/2003 |
| RU | 2277762 | 6/2006 |
| RU | 2360364 C2 | 6/2006 |
| TW | 462155 B | 11/2001 |
| TW | 508910 B | 11/2002 |
| TW | 546927 B | 8/2003 |
| TW | 584996 B | 4/2004 |
| WO | WO9427381 A1 | 11/1994 |
| WO | WO9824198 | 6/1998 |
| WO | WO9830057 A1 | 7/1998 |
| WO | WO-9917576 A1 | 4/1999 |
| WO | WO9918689 | 4/1999 |
| WO | WO9935865 A1 | 7/1999 |
| WO | WO9945736 | 9/1999 |
| WO | WO0014900 A1 | 3/2000 |
| WO | WO0055976 A2 | 9/2000 |
| WO | 0108325 A1 | 2/2001 |
| WO | WO0120808 A2 | 3/2001 |
| WO | WO01017158 | 3/2001 |
| WO | 0124402 | 4/2001 |
| WO | WO0178291 A2 | 10/2001 |
| WO | WO0182504 | 11/2001 |
| WO | WO0232179 A1 | 4/2002 |
| WO | WO0239609 | 5/2002 |
| WO | WO0249305 | 6/2002 |
| WO | WO-02052757 A1 | 7/2002 |
| WO | WO02091597 | 11/2002 |
| WO | WO03034645 | 4/2003 |
| WO | WO-03049396 A2 | 6/2003 |
| WO | WO03085878 A1 | 10/2003 |
| WO | WO2004025869 | 3/2004 |
| WO | WO2004025986 A2 | 3/2004 |
| WO | WO2004032548 A1 | 4/2004 |
| WO | WO2004042954 A1 | 5/2004 |
| WO | WO2004059874 | 7/2004 |
| WO | WO-2004077871 A1 | 9/2004 |
| WO | WO2004104530 | 12/2004 |
| WO | WO2004105294 | 12/2004 |
| WO | WO2005034545 A1 | 4/2005 |
| WO | WO-2005069519 | 7/2005 |
| WO | WO-2005071868 A1 | 8/2005 |
| WO | WO2006007318 A1 | 1/2006 |
| WO | WO2006012376 A1 | 2/2006 |
| WO | WO2007014037 A2 | 2/2007 |
| WO | WO2007050846 | 5/2007 |
| WO | WO2007112141 | 10/2007 |
| WO | WO2007146891 | 12/2007 |
| WO | WO2008030823 | 3/2008 |

OTHER PUBLICATIONS

Written Opinion, PCT/US06/042060, International Search Authority, European Patent Office, Jun. 27, 2007.
International Preliminary Report on Patentability, PCT/US06/042060, International Search Authority, The International Bureau of WIPO, Geneva, Switzerland, Apr. 29, 2008.
Bowie, Song et al., "Iterative Joint Channel Estimation and Signal Detection in MIMO OFDM Systems," Institute of Image Communication and Information Processing, Shanghai Jiao Tong University Shanghai, China, 2005, pp. 39-43.
Shao, L. et al.; "Downlink multicell MIMO-OFDM: An architecture for next generation wireless networks," in Proc. IEEE Wireless commun. and Netowrking Conf. (WCNC), vol. 2, Santa Clara, USA, Mar. 2005, pp. 1120-1125.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
Elmusrati, et al., "Multi-Objective Distributed Power Control Algorithm," Vehicular Technology Conference Proceedings VTC 2002 Fail IEEE 56th, vol. 2, pp. 812-816.
Hosein, "Interference Management of OFDMA Uplinks," IEEE 65th Vehicular Technology Conference, VTC2007-Spring, pp. 2435-2439, Apr. 22-25, 2007.
L.M. Nevdyaev, Telecornriiunication Technologies, Moscow, Svyaz' I Biznes, 2002, p. 209.
Roberto Padovani, "The Application of Spread Spectrum to PCS has Become a Reality Reverse Link Performance of IS-95 Based Cellular Systems," IEEE Personal Communication, US, IEEE Communications Society, vol. 1. No. 3, Jul. 1, 1994, pp. 28-34.
Tanaka et al., Fast initial acquisition of transmitter power for the reverse link DS/CDMA cellular systems, May 1998, IEEE Vehicular Technology Conference, p. 2436-2440.
Telecommunications Industry Association, "Mobile Station-Base Station Compatibility Standard for Dual-Mode Wideband Spread Spectrum Cellular System," TIA/EIA-95, Jul. 1993.
Tomcik, T.: "QTDD Performance Report 2," IEEE 0802.20-05/88, IEEE 802.20 Working Group on Mobile Broadband Wireless Access, <http://ieee802.org/20/>, pp. 1-56, XP002386798 (Nov. 15, 2005).
U.S. Appl. No. 60/516,557, on Oct. 30, 2003 by Ji. et al., 6 pages.
Qualcomm Incorporated: QFDD Technology Overview Presentation, IEEE 80220 Working Group on Mobile Broadband Wireless Access, [Online] No. C80220-05-59, XP002518168 [Retrieved from the Internet: Url:http://grouperieeeorg/groups/. Nov. 2005.
Tomick, Jim: "QFDD and QTDD:Technology Overview" IEEE 802.20 Working Group on Mobile Broadcast Wireless Access [Online] Oct. 28, 2005, pp. 1, 61-106.
C30-20060327-023, "QUALCOMM Proposal for 3GPP2 Air Interface Evolution Phase 2", Dallas, TX, Mar. 2006.
China Unicom et al., "Joint Proposal for 3GPP2 Physical Layer for FDD Spectra", C30-20060731-040R4_HKLLMNQRSUZ_PP2Phase2_FDD Proposal -1,3GPP2, Jul. 31, 2006.
Qualcomm Incorporated: "Qualcomm Proposal for 3GPP2 Physical Layer", C30-20060522-035 QC_Proposal_v1.0, 3GPP2, May 22, 2006.
Qualcomm Incorporated: "Qualcomm Proposal for 3GPP2 Physical Layer for FDD Spectra", C30-20060626-028_QCOM_UHDR-One_FDD_Proposal_v1.0, 3GPP2, Jun. 26, 2006.
Tomcik, J., "QFDD and QTDD: Technology Overview", IEEE 802.20 Working Group on Mobile Broadband Wireless Access, October 28, 2005, pp. 48-50, URL, http://www.IEEE802.org/20/contribs/C802.20-05-68.zip.
Tomcik J., "QTDD Technology Overview Presentation", IEEE C802.20-05-64r1, Nov. 15, 2005.
Siemens, "Power Control for E-UTRA Random Access and TP," 3GPP TSG-RAN WG1 #44bis, 3GPP, Mar. 31, 2006, Tdoc R1-061041.

* cited by examiner

METHOD AND APPARATUS FOR ESTIMATING REVERSE LINK LOADING IN A WIRELESS COMMUNICATION SYSTEM

RELATED APPLICATIONS

This application claims priority to U.S. Provisional Patent Application Nos. 60/731,132, filed on Oct. 27, 2005, entitled METHOD AND APPARATUS FOR ESTIMATING REVERSE LINK LOADING IN A WIRELESS COMMUNICATION SYSTEM"; and 60/731,013, filed on Oct. 27, 2005, entitled "MOBILE BROADBAND WIRELESS ACCESS SYSTEMS AND METHODS", which are incorporated by reference herein.

This application relates to U.S. Pat. No. 6,397,070, issued May 28, 2002; and to U.S. Patent Application entitled "ROBUST ERASURE DETECTION AND ERASURE-RATE-BASED CLOSED LOOP POWER CONTROL", having Ser. No 10/890,717, which are assigned to the assignee of this application and specifically incorporated by reference herein.

BACKGROUND

I. Field of the Invention

Aspects of the invention relate to wireless communications. More particularly, the aspects of the invention relate to estimating reverse link loading in a wireless communication system.

II. Description of the Related Art

If a minimum acceptable signal quality is specified, an upper bound on the number of simultaneous users, which can communicate through a base station, can be calculated. This upper bound is commonly referred to as the pole capacity of a system. The ratio of the actual number of users to the pole capacity is defined as the loading of the system. As the number of actual users approaches the pole capacity, loading approaches unity. A loading close to unity implies potentially unstable behavior of the system. Unstable behavior can lead to degraded performance in terms of voice quality, high error rates, failed handoffs, and dropped calls. In addition, as loading approaches unity, the size of the coverage area of the base station shrinks so that users on the outer edge of the no-load coverage area are no longer able to transmit sufficient power to communicate with the base station at an acceptable signal quality.

For these reasons, it is advantageous to limit the number of users that access the system so that loading does not exceed a specified percentage of the pole capacity. One way to limit the loading of the system is to deny access to the system once the loading of the system has reached a predetermined level. For example, if the loading increases above 70% of the pole capacity, it is advantageous to deny requests for additional connection originations, and to refrain from accepting hand-off of existing connections.

In order to limit the loading on the reverse link to a specified level, it is necessary to measure the reverse link loading. Reverse link loading of a base station is not solely a function of the number of remote units that are operating within the coverage area of the base station. Reverse link loading is also a function of interference from other sources. The front-end noise of the base station itself is a significant source of interference. In addition, other remote units operating on the same frequency within the coverage area of nearby base stations may contribute significant interference.

One means by which the reverse link loading can be measured is by averaging the measured signal to interference operation point of all active connections within the coverage area. This approach has several drawbacks. The signal to interference operation statistics of the active connections provide an indication of system performance. However, they do not provide any information concerning the amount of interference from remote units located in the coverage area of other base stations. In addition, when a remote unit is in soft hand-off between two or more base stations, it is likely that the actual signal to interference ratio at which the reverse link signal is received at any one base station is significantly beneath the signal to interference ratio set point determined by the system, thus, falsely indicating an extremely high loading level. For these reasons, measuring the average signal to interference operation point of all active connections within a base station does not provide an accurate measure of reverse link loading.

A second and simple means of determining reverse link loading is to simply count the number of active users in the base station. However, because the level of interference from other sources significantly affects loading, it should be clear that the number of users is not necessarily a good indication of reverse link loading. In addition, the effects of soft hand-off greatly decrease the correlation between the number of active users and the actual loading at the base station.

A third means of estimating the reverse link loading is to attempt to derive the reverse link loading based upon an estimate of the forward link loading. However, in a typical system the forward and reverse links do not operate at the same frequencies. Consequently, the interference from the coverage areas of adjacent base stations can be different on the forward link than on the reverse link. In addition, the effects of fading are independent as between the forward and reverse links. Furthermore, loading is a function of a data rate of a particular user. Therefore, the forward link performance is not perfectly correlated with reverse link performance.

If one of these inaccurate methods of estimating the reverse link loading is used, the system cannot accurately determine whether connection blockage is necessary. If calls are blocked unnecessarily, the capacity of the system is unnecessarily decreased. On the other hand, if the loading is permitted to approach the pole capacity, the probability of dropping a significant number of active connections increases. For this reason, it is important to have an accurate estimation of the reverse link loading.

In his book entitled "CDMA: Principles of Spread Spectrum Communication" (Addison-Wesley Wireless Communications, 1995), Dr. Andrew J. Viterbi defines reverse link loading as a function of the total received power perceived at the base station receiver. The reverse link loading X is directly related to the total power received by the base station according to the following formula:

$$\frac{P_a}{P_n} = \frac{1}{1-X} \quad (1)$$

where: $P_a$ is the actual power received at the base station;

$P_n$ is the power received at no external loading (e.g. the power due to the thermal noise floor of the base station); and X is the reverse link loading in terms of the ratio of actual loading to pole capacity.

Or equivalently, expressed in terms of X, Equation 1 takes on the following expression:

$$X = \frac{P_a - P_n}{P_a} \qquad (2)$$

For example, this formula states that at 50% loading (X=0.5), the total power received at the base station is twice that which is received at no loading.

Given the relationship shown in Equation 1, current base station loading X can be determined based upon a known no load power level and an actual measurement of the total power received at the base station. Note that the actual power measurement should be filtered with an appropriate time constant in view of the time constant at which the power control operation varies the transmit power of the remote unit. In addition, if the reverse link operates at variable data rates resulting in gated transmissions from the remote units, the actual power measurement should be filtered to average the effects of the gated transmissions on the instantaneous power measurement.

The dynamic range of the relative power measurement ($P_a/P_n$) is not large in a typical system. For example, as the loading X increases from 0 to 90% of the pole capacity, the ratio of ($P_a/P_n$) increases from 0 to 10 decibels (dB). Typically, base station loading X is limited to about 60-75% of the pole capacity. As X increases from 0.6 to 0.75, the ratio of ($P_a/P_n$) increases from about 4 to about 6 dB. Therefore, to accurately limit the loading of the reverse link, the ratio of ($P_a/P_n$) should be measured with less than 1 dB of error in order to avoid over- or under-estimation of the loading.

While this approach appears to be straightforward, in reality, it is difficult to achieve consistently required accuracy of the relative power measurements. For example, accurately measuring the noise floor (e.g., Pn) of a base station in an operating environment is difficult. In addition, even if an accurate measurement of the noise floor could be made at one time, the noise floor is sensitive to gain and noise figure variations due to temperature, aging and other phenomena, and, hence, the noise floor power level changes as a function of time. Without a means of accurate measurement, any admission control algorithm based upon Equation 2 will likely block connections when no blocking is necessary or admit connections resulting in potentially unsteady system behavior.

In addition to the no load power measurement, the actual power received at the base station must also be measured. The measurement of the absolute power level using power meters or automatic gain control circuits is extremely difficult within an accuracy of a few dB. In order to achieve this sort of accuracy in an absolute power measurement, the cost and size of the measurement apparatus becomes prohibitive.

In another improved method for determining cell loading, a system enters a period of silence. During the period of silence, a remote test unit generates a reverse link signal. A base station demodulates the reverse link signal and generates a series of closed loop power control commands for the remote unit. The remote unit responds to the power control commands by adjusting the level at which it transmits the reverse link signal. As the system operating point changes in response to the new operating conditions, the series of commands are accumulated to determine a transmit gain adjustment value corresponding to the period of silence, TGA(0). Once normal system operation is resumed, the base station demodulates the reverse link signal from the remote test unit and generates a series of power control commands for the remote unit. As the system operating point changes in response to the normal operating conditions once again, the series of power control commands are accumulated to determine a transmit gain adjustment value for the current system loading, TGA (t). Using TGA(0) and TGA(t), the system loading is determined. This method for determining cell loading is described in detail in copending U.S. patent application Ser. No. 09/204,616, entitled "METHOD AND APPARATUS FOR LOADING ESTIMATION", assigned to the assignee of the present invention and incorporated by reference herein.

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in U.S. Pat. No. 6,396,804, entitled "HIGH DATA RATE CDMA WIRELESS COMMUNICATION SYSTEM", issued May 28, 2002, assigned to the assignee of the present invention and incorporated by reference herein.

SUMMARY

A method of calculating a reverse link loading in a wireless communication system is described. The method includes estimating interference from at least one access terminal not being served by an access point; measuring a receiver noise; and comparing the interference to the receiver noise. The method may be further characterized in that the estimating interference includes measuring a received power in a null time and frequency interval. Further, the measuring may include measuring a first received power outside a null time and frequency interval. The null time and frequency interval may be a guard band.

The estimating interference may include measuring a second received power in the null time and frequency interval. The method may be used to control a transmission power. In that case, the transmission power is increased responsive to the comparing. The method may also be used to respond to an admission request. In that case, the admission request is denied responsive to the comparing. In another case, a data rate may be decreased responsive to the comparing. The wireless communication system may be an orthogonal frequency division multiple access (OFDMA) wireless communication system and the null time and frequency interval may be a tone of the OFDMA wireless communication system.

The comparing may include dividing the interference by the receiver noise. The estimating interference from at least one access terminal not being served by an access point may include detecting a first pilot signal; detecting a second pilot signal; and subtracting the first pilot signal from the second pilot signal.

A wireless communication device is described, the device including a processor configured to: estimate interference from at least one access terminal not being served by the wireless communication device; measure a receiver noise; and compare the interference to the receiver noise; and a transmitter coupled to the processor and configured to transmit wireless communication signals to a plurality of wireless communication access terminals. The processor may be configured to measure a received power in a null time and frequency interval and measure a first received power outside a null time and frequency interval. The null time and frequency interval may be a guard band.

The processor may also be configured to measure a second received power in the null time and frequency interval and increase the transmission power responsive to the comparing. The processor may be configured to deny the admission request responsive to the comparing or decrease the data rate responsive to the comparing. The wireless communication device may be an orthogonal frequency division multiple access (OFDMA) wireless communication device and the null time and frequency interval may be a tone of a OFDMA wireless communication system. The processor may be configured to divide the interference by the receiver noise.

A machine-readable medium having stored thereon instructions, which when executed, cause a machine to estimate interference from at least one access terminal not being served by an access point; measure a receiver noise; and compare the interference to the receiver noise. The instructions may also include any of the functions described above with respect to the method described above.

A method for assisting a calculation of a reverse link loading in a wireless orthogonal frequency division multiple access communication system is also described. The method includes identifying a null time and frequency interval; and nulling a wireless transmission during the null time and frequency interval. The nulling may include nulling out a tone of a fast fourier transform filter.

A mobile wireless communication device is also described, which includes a processor configured to identify a null time and frequency interval; null a wireless transmission during the null time and frequency interval; and a transmitter coupled to the process, the transmitter configured to transmit the wireless transmission.

BRIEF DESCRIPTION OF THE DRAWINGS

Aspects of the invention will become more apparent from the detailed description set forth below when taken in conjunction with the drawings in which like reference characters identify correspondingly throughout and wherein.

DETAILED DESCRIPTION OF THE DRAWINGS

Methods and apparatuses for estimating reverse link loading in a wireless communication system are described. The reverse link interference is measured and reverse link receiver noise is measured. The reverse link interference is compared to the reverse link receiver noise, for example, by dividing the interference power by the receiver noise power. The reverse link receiver noise can be measured in an orthogonal frequency division multiple access (OFDMA) system by nulling transmission from access terminals within the cell and nearby during a null time and frequency interval. Power measured in the null time and frequency interval is receiver noise power. The reverse link interference can be measure by several means. For example, local null time and frequency intervals can be designated. The access terminals within the cell or sector null their transmissions during the local time and frequency intervals. Access terminals outside the cell continue to transmit during the local time and frequency intervals. Power measured in the local time and frequency interval is interference power. As another example, interference power can be measured by subtracting pairs of pilot symbols that are contiguous to each other in time or frequency.

Figure 1:
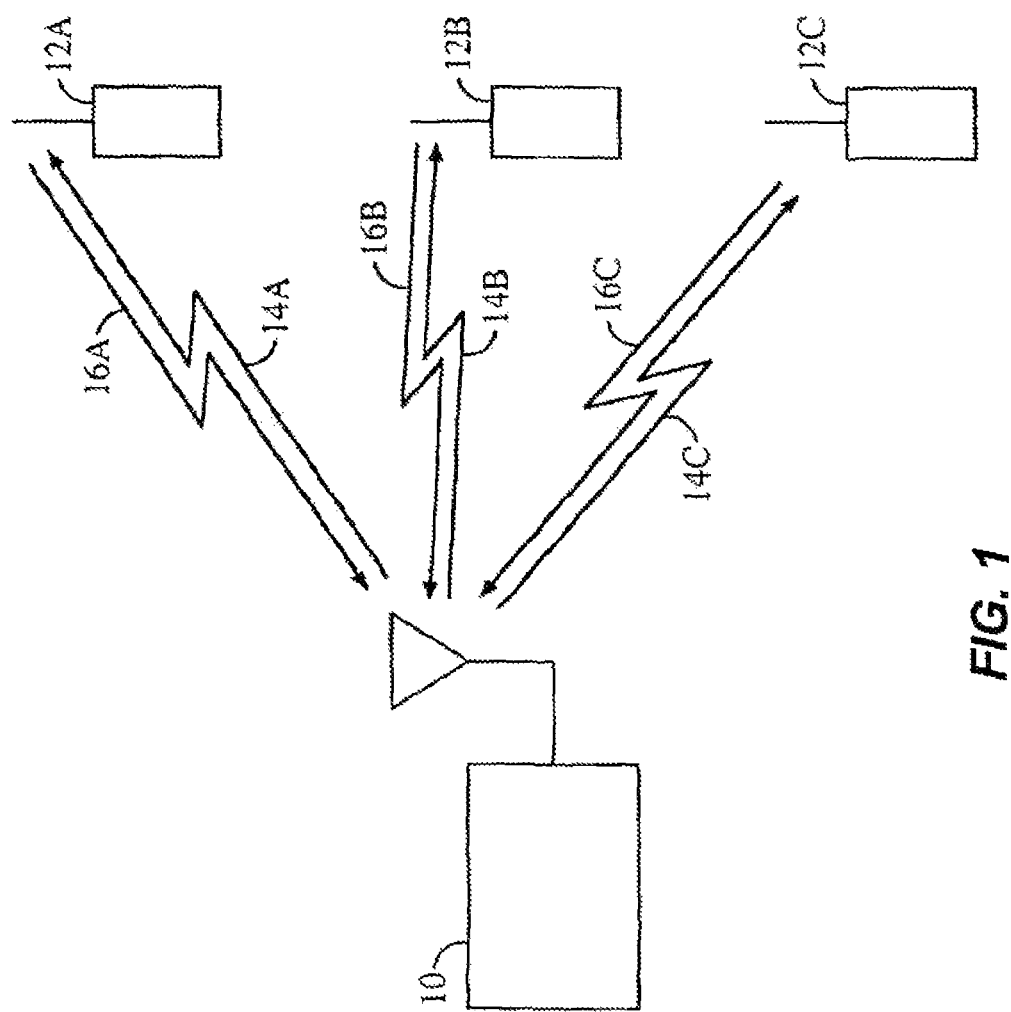
FIG. 1 is a diagram showing the elements of a wireless communication system.

FIG. 1 provides a highly simplified illustration of a wireless telephone system. Base station (BS) 10 communicates with a plurality of remote stations (RS) 12a-12c over an RF interface. The signals transmitted from base station 10 to remote stations 12 are referred to herein as forward link signals 14. The signals transmitted from remote stations 12 to base station 10 are referred to herein as reverse link signals 16.

Figure 2:
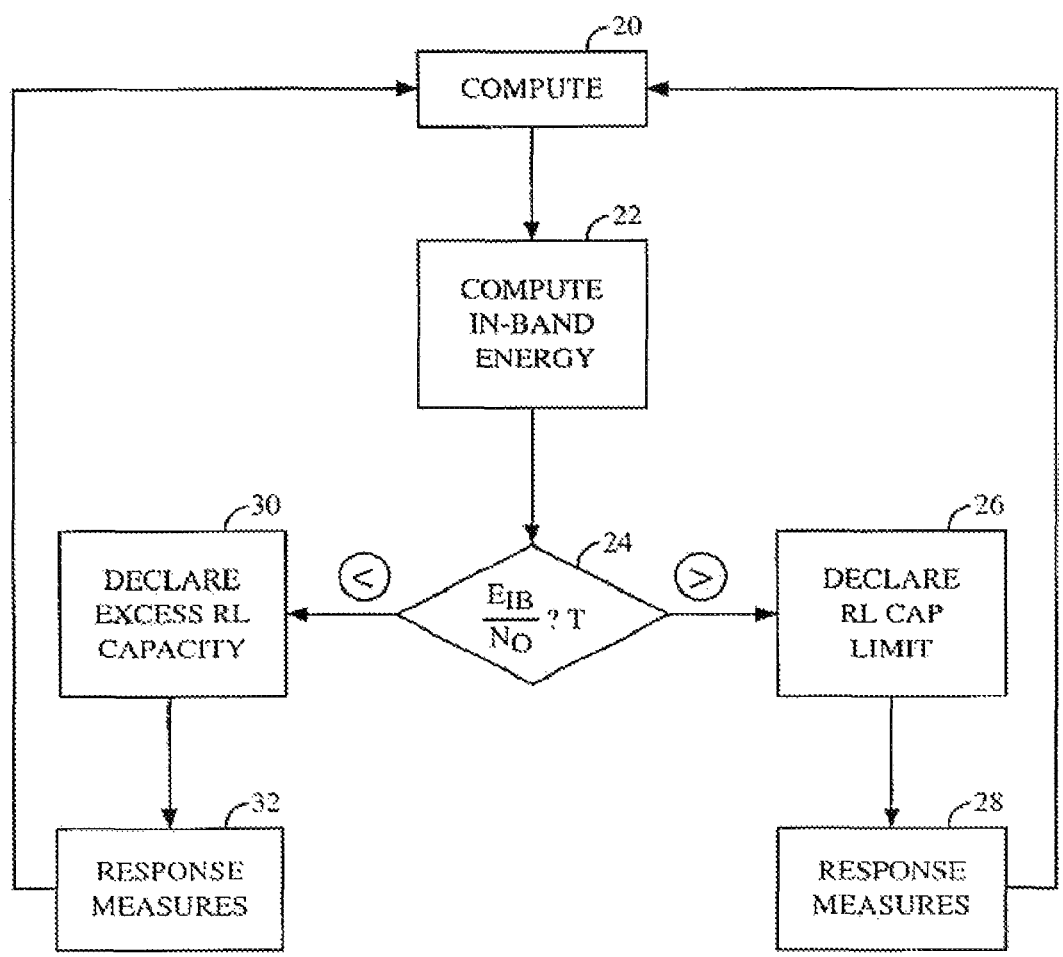
FIG. 2 is a flowchart illustrating the operation of estimating the reverse link loading and responding to the estimates.

FIG. 2 depicts a flowchart diagram illustrating basic steps of estimating the reverse link capacity limits of the present invention. One skilled in the art can appreciate that although the diagram is drawn in a sequential order for comprehension, certain steps can be performed in parallel in actual realization. In block 20 a noise floor equivalent of an unloaded cell $N_0$ is calculated. In the present invention, each of remote stations 12 transmit a reverse link signal 16, which is processed through a notch filter such that in the frequency band within the notch, the energy transmitted by the remote stations is negligible. Consequently, any energy in such frequency band is due to the noise floor of the base station.

In block 22 an in-band energy IO is calculated. In the preferred embodiment, the in-band energy is measured by computing the sum of the squares of the in-band digital samples. This measurement can also be performed by examining the scaling operation of the automatic gain control element of receiver in the base station. However, in cell wilting conditions, in which the base station injects noise into the received signal, the inband energy measurement must be performed in a manner that removes the effects of the injected noise prior to using the automatic gain control scaling as an indication of in band energy. Cell wilting is an operation in which a cell that has exceeded its loading thresholds modifies its operation to make the base station appear further away from remote stations in its coverage area. Cell wilting is well known in the art and is described in detail in U.S. Pat. No. 5,548,812, entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM", assigned to the assignee of the present invention and incorporated by reference herein.

In block 24 a ratio of the in-band energy to the noise floor, IO/N0, is compared to a threshold T. In the present invention, the ratio of the noise energy with the mobile stations transmitting to the noise energy at the base station without any mobile stations transmitting is used to determine the loading condition.

If the ratio is greater than the threshold, a reverse link loading capacity limit is declared in block 26. An appropriate responsive measure is taken in block 28. In a first exemplary embodiment, in response to the cell loading declaration, base station 10 transmits a signal indicating that it has reached a reverse link loading limit on forward link signals 14. In response to this signal, the remote stations in the coverage area of base station 10 adjust the transmission of reverse link signals 14. The adjustment may be in the form of a data rate reduction or in the transmission energy of the signals or both. Alternatively, the remote stations 12 in the coverage area of base station 10 will inhibit the transmission of reverse link signals 14 when receiving the signal indicating that reverse link capacity limit has been reached.

An additional response measure that may be taken in response to the determination that base station 10 has reached a reverse link capacity limit is that the base station performs a wilting operation, which makes it appear further from mobile stations in its coverage area than it actually is. This wilting operation entails reducing energy of its forward link transmissions 14 and injecting noise into its reverse link receiver path as described in detail in the aforementioned U.S. Pat. No. 5,548,812.

If the ratio is less than the threshold, a reverse link loading capacity excess is declared in block 30. In this condition, the base station can provide service to additional mobile station. An appropriate responsive measure is taken in block 32. In a first exemplary embodiment, in response to the determination that the cell has excess capacity, base station 10 transmits a signal indicating that it has additional reverse link capacity on forward link signals 14. In response to this signal, the remote stations in the coverage area of base station 10 adjust the transmission of reverse link signals 14. The adjustment may be in the form of a data rate increase or a transmission energy increase or both.

An additional measure that may be taken in response to the determination that base station 10 has reached a reverse link capacity limit is that the cell performs a cell blossoming operation. The blossoming operation is essentially the removal of the cell from a wilting operation mode.

Figure 3:
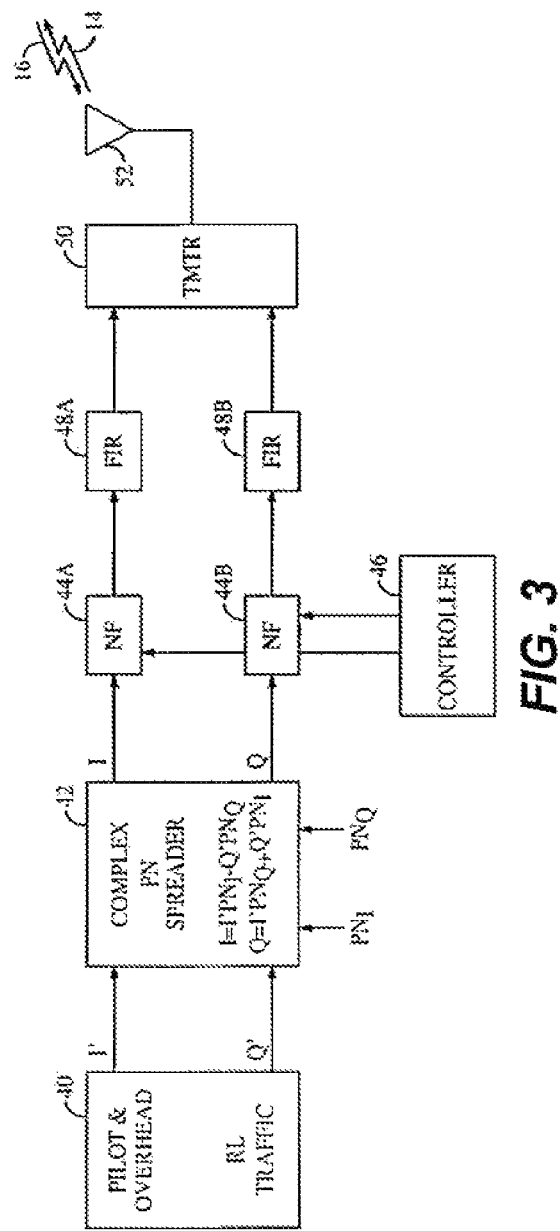
FIG. 3 is a block diagram of a remote station.

FIG. 3 is a partial block diagram of a remote station 12. An in-phase component (I') and quadrature component (Q') of a signal 40 to be transmitted is provided to a complex pseudonoise (PN) spreader 42. It will be understood by one of ordinary skills in the art that processing of the signal 40 including forward error correction coding, interleaving, and rate matching are performed prior to the signal's provision to the a complex pseudo-noise spreader 42. In the exemplary embodiment, overhead information such as pilot symbols and power control bits are provided to the I' input of complex pseudonoise (PN) spreader 42, while traffic channel data is provided to the Q' input of complex pseudonoise (PN) spreader 42.

Figure 4A:
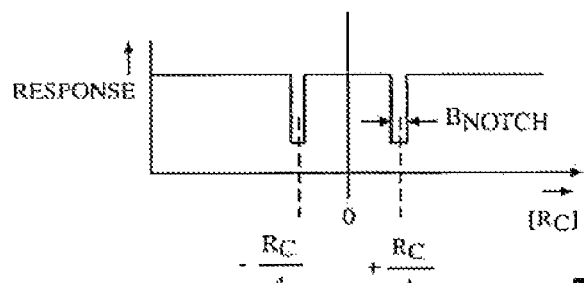
FIGS. 4A-4C are illustrations of frequency response curves of filters for forming notches in signals.
Figure 4B:
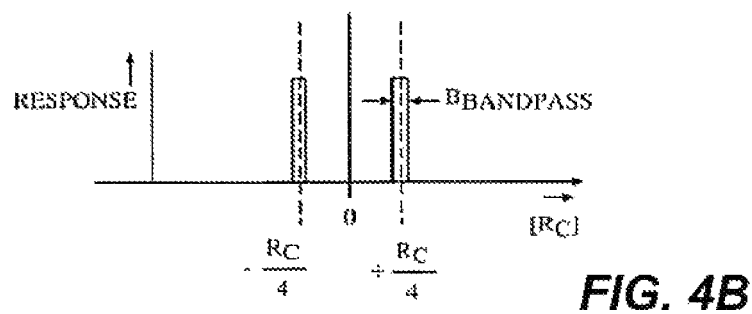

In the exemplary embodiment, complex PN spreader 40 spreads the signals in accordance with two distinct PN sequences PNI and PNQ. Complex PN spreading is well known in the art and is described in U.S. Pat. No. 6,396,804, entitled "HIGH DATA RATE CDMA WIRELESS COMMUNICATION SYSTEM", issued May 28, 2002, which is assigned to the assignee of the present invention and incorporated by reference herein. The in-phase component (I) and quadrature component (Q) of complex PN spread signals are provided to corresponding notch filters (NF) 44a and 44b. As described above the notch filters are provided so that remote stations do not transmit energy into a portion of the spectrum used for the transmission of reverse link signals 14. Energy in these notches provide the estimate of the unloaded energy of base station 10. FIG. 4a illustrates an exemplary frequency response for notch filters 44a and 44b. In a preferred embodiment, the positions of the notches are provided at ±RC/4 in the baseband, which will be upconverted to fC±RC/4, where fC is a carrier frequency, and RC is a chip rate. The particular location for the notches is preferred because it can be implemented with minimal computational complexity. It will be understood by one skilled in the art that the locations of the notches can be arbitrarily selected without departing from the scope of embodiments of the invention.

Controller 46 controls the frequency response characteristics of notch filters 44a and 44b. In a first embodiment, controller 46 provides no variation in the frequency response of notch filters 44a and 44b. The first embodiment, has the benefit of simplicity but suffers form the defect that the energy over the band may not be uniform and as such may provide a poor estimate of the unloaded in band energy. In a second embodiment, controller 46 sweep the location of the notch over the transmission band of reverse link signals 14. In a third embodiment, controller 46 hops the location of the notch of filters 44a and 44b. One of ordinary skills in the art will understand that the enumerated possibilities are by no means exhaustive, and are provided merely as examples of methods of providing samples of the inband unloaded noise energy across the transmission band to base station 10.

Figure 4C:
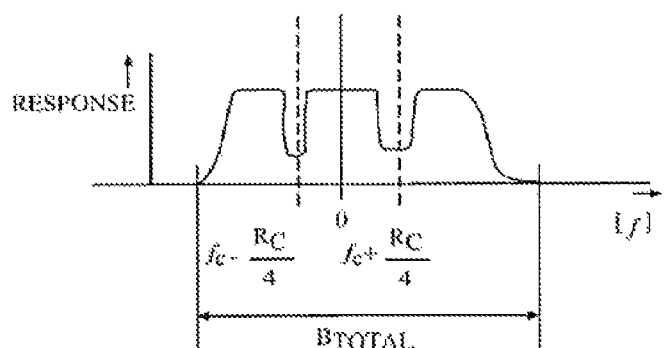

The notch filtered I and Q components are then provided to a pulse shaping filters (FIR) 48a and 48b. Pulse shaping filters 48a and 48b are provided to reduce out of band emissions. In the preferred embodiment, the notch filtering operation is performed at baseband prior to filtering in FIR filters 48a and 48b. The reason for notch filtering prior to the pulse shaping is that in the current systems the pulse shaping filters require a sampling rate higher than the baseband chip rate in order to reduce the out of band emissions of reverse link signals 14 to specified limits. It will be understood by one skilled in the art that notch filters 44a and 44b can be provided subsequent to pulse shaping filters 48a and 48b and can even be performed at the RF frequencies subsequent to up conversion in transmitter 50. FIG. 4c depicts the frequency characteristics of the signal output by pulse shaping filters 48a and 48b with notches at frequencies fC±RC/4.

Figure 4D:
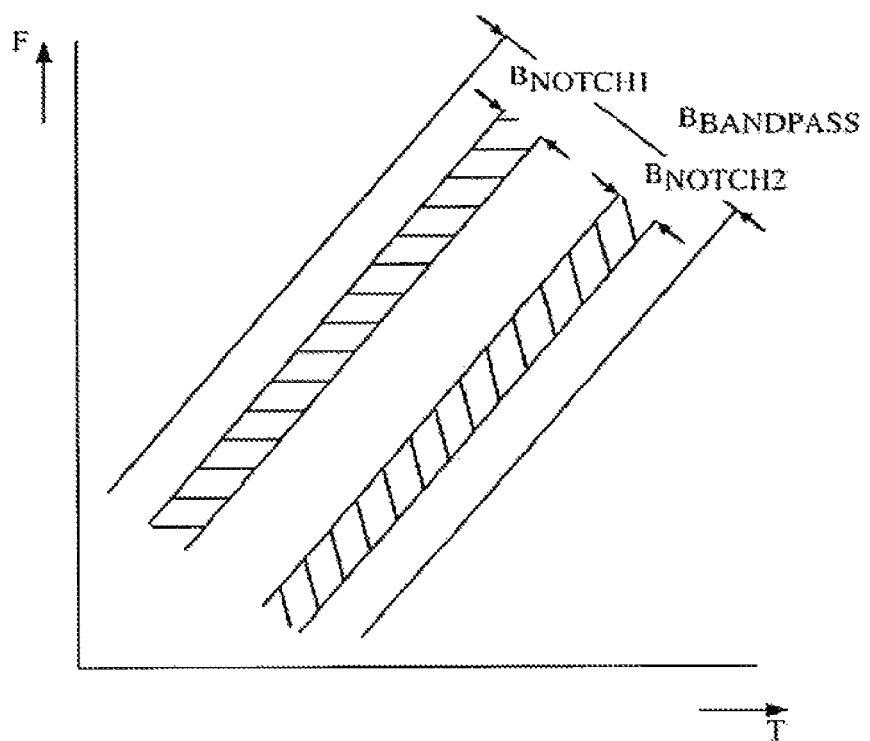
FIG. 4D is an illustration of different sets of notches of two different portions of the spectrum for different users.

Transmitter 50 up-converts, amplifies, and filters the signals in accordance with a chosen modulation format, and provides the processed signals to an antenna 52 for transmission over reverse link 16. In the exemplary embodiment, transmitter 50 upconverts the signals for transmission in accordance with a quaternary phase shift keyed modulation (QPSK). The present invention is equally applicable to other modulation schemes, such as BPSK and QAM modulation. FIG. 4d depicts an exemplary embodiment of the invention, in which two different sets of users notch two different portions of the spectrum used for transmission of reverse link signals. In such embodiment, the bandwidth of the filters 66a and 66b BBandpass must be wide enough to include bandwidths of the notches BNotch1 and BNotch2 of the users. One ordinarily skilled in the art can recognize that FIG. 4d uses two different sets of users only for the purpose of explanation, and can be extended to different number of users without departing from the spirit of the invention. Likewise, the linear sweep of frequency with time is not meant to limit the scope of the invention to this particular embodiment.

Figure 5:
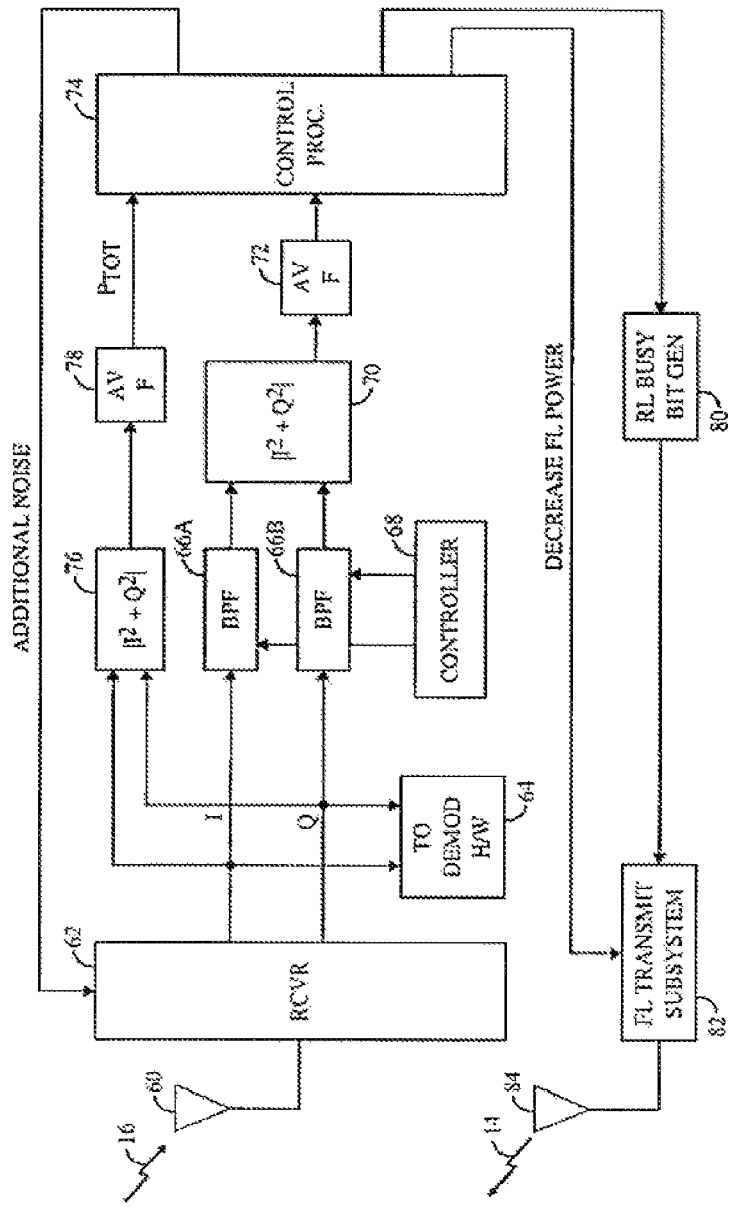
FIG. 5 is a block diagram of a base station.

FIG. 5 is a partial block diagram of a base station 10. Reverse link signals 14 are received by an antenna 60, and provided to a receiver (RCVR) 62. Receiver 62 down-converts, amplifies, and filters the received signals. In the exemplary embodiment, the demodulation format is quaternary phase shift keying, though the present invention is equally applicable to other demodulation formats. The I and Q components of the received signal are then provided to a demodulation block 64, to band-pass filters (BPF) 66a and 66b, and to energy calculator 76.

The demodulator 64 processes the I and Q components for its information value in accordance with applicable protocol.

The characteristics of the notch filters 66a and 66b are controlled by a controller 68. The control signals of controller 68 mirrors the control signals of controller 46. Consequently, the characteristics of the notch-filters 44a and 44b are aligned with the characteristics of the band-pass filters 66a and 66b. Thus, the output of band pass filters 66a and 66b are portions of reverse link signals 14 that are filtered out by notch filters 44a and 44b. The frequency response of bandpass filters 66a and 66b are illustrated in FIG. 4c. It can be seen that the purpose of the bandpass filters is to direct the portion of the reverse link spectrum that was notched by filter 44 to energy calculator 70.

The outputs of the band-pass filters 66a and 66b are provided to energy calculator 70. In the exemplary embodiment, the filtered digital samples from band pass filters 66a and 66b are squared and then summed to provide an estimate of the energy in the notched frequency band portions of the reverse link transmissions from remote stations 12.

The sum of the squares are provided to filter 72. In the exemplary embodiment, filter 72 is a moving average filter that can be implemented in a variety of ways such as using a finite impulse response filter. The output of filter 72 is provided to a control processor 74 as an estimate of the noise energy in the frequencies notched out of the reverse link transmissions from remote stations 12.

In the computation of the in band energy, the digitized samples from receivers 62 are provided to energy calculator 76. Energy calculator 76 estimates the total in band energy (IO) by summing the squares of the digitized samples and providing those values to filter 78. As described with respect to filter 72, in the exemplary embodiment, filter 78 is a moving average filter. The filtered energy samples are provided to control processor 74 as an estimate of the total in-band energy IO.

The control processor 74 is further provided with an information about the bandwidth of the NF and BPF, and, a chip rate. Based on the bandwidth of reverse link transmissions 16 and the bandwidth of the notches of filters 44a and 44b, the control processor 74 then calculates an estimate of the reverse link loading (RLL) in accordance with a general equation:

$$RLL = \frac{I_O}{\left[I_{Notch} - 2I_O\left(\frac{B_{Bandpass} - B_{Notch}}{B_{Total}}\right)\right]} \frac{2B_{Notch}}{B_{Total}} \quad (3)$$

where $I_o$ is the estimated total in band energy determined in accordance with the output of filter 78, $I_{notch}$ is the estimated energy in the notched portions of reverse link signals 14, $B_{Total}$ is the total bandwidth of reverse link signals 14, $B_{Notch}$ is the bandwidth of the notches provided by filters 44a and 44b, and $B_{Bandpass}$ is the bandwidth of the filters 66a and 66b. The factor of 2 in the denominator of equation (3) is based on the fact that there are two notches in the reverse link signal spectrum and that the notches have equal bandwidth $B_{Notch}$.

This equation shall be utilized in an embodiment when different sets of users will notch different portions of the spectrum used for transmission of reverse link signals. In such embodiment, the bandwidth of the filters 66a and 66b must be wide enough to include bandwidths of the notches of all the users. In a different embodiment, where $B_{Bandpass}$ equals $B_{Notch}$, i.e., when all the users notch the same portion of the spectrum used for transmission of reverse link signals, the equation reduces to a form:

$$RLL = \frac{I_O}{I_{Notch}} \cdot \frac{2B_{Notch}}{B_{Total}}, \quad (4)$$

One skilled in the art will appreciate that aspects of the invention can be easily extended to an arbitrary number of notches and to notches of varying widths. In addition, it will be understood by one skilled in the art that the scaling of the ratio between the notched frequency portions and the in band energy need not be performed. Rather the threshold against which this ratio is compared may be scaled, reducing the computational complexity of the operation performed by control processor 74.

The reverse loading is then compared to a threshold (T). The control processor 74 then takes a responsive measure based on the result of the comparison.

If the reverse loading is greater than the threshold, a reverse link loading capacity limit is declared. In one embodiment of the invention, the control processor 74 responds by wilting the cell. A control command to decrease transmission power of forward link signals 14 is sent to forward link transmission subsystem 78. In response to this signal, the power amplifier (not shown) in the forward link transmission subsystem 78 reduces the gain of the transmissions. In addition, a corresponding signal to increase a noise floor of the receiver is sent to the receiver 62. In response to this signal noise is injected into the received reverse link signals. The result is that the base station appears to be further from mobile stations than it actually is which forces the mobile stations to move into a handoff to adjacent cells which have additional capacity.

If the reverse loading is less than the threshold, a reverse link loading capacity excess is declared. In one embodiment of the invention, the control processor 74 responds by blossoming the cell. A control command to increase transmission power is sent to forward link transmission subsystem 78, and corresponding signal to decrease a noise floor of the receiver is sent to the receiver 62.

In another embodiment, the result of the comparison is sent to a RL Busy Bit Generator 76. The RL Busy Bit Generator 76 generates a RL Busy Bit with a first value if the reverse loading is greater than the threshhold, and a RL Busy Bit with a second value if the reverse loading is less than the threshold. The base station 10 can then take an appropriate action. In one embodiment, the base station 10 can decrease the allowable number of users if the reverse link loading has been exceeded, and increase the allowable number of users if the reverse link loading is below allowable limit. In another embodiment, the base station 10 can decrease the allowable data rate for at least one user if the reverse link loading has been exceeded, and increase the allowable data rate for at least one user if the reverse link loading is below allowable limit.

Figure 6:
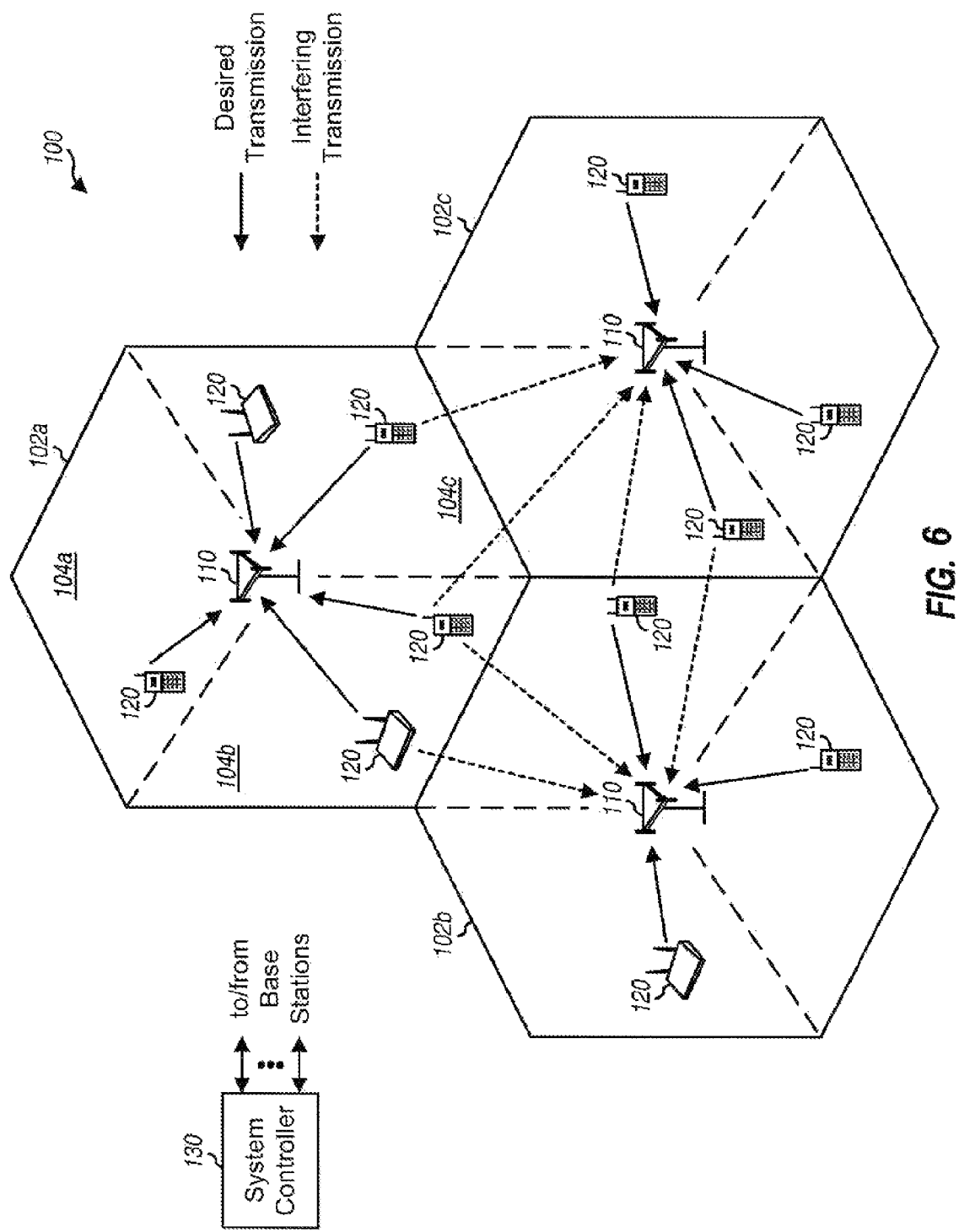
FIG. 6 illustrates a sectorized wireless communication system.

FIG. 6 shows a wireless communication system 100 with multiple base stations 110 and multiple terminals 120. Base stations 110 may be base station 10. Terminals 120 may be terminals 12A, 12B and 12C. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. A system controller 130 couples to base stations 110 and provides coordination and control for these base stations.

A terminal may be fixed or mobile and may also be called a mobile station, a wireless device, a user equipment, or some other terminology. Each terminal may communicate with zero, one, or multiple base stations at any given moment.

The interference control techniques described herein may be used for a system with sectorized cells and a system with un-sectorized cells. In the following description, the term "sector" refers to (1) a conventional BTS and/or its coverage area for a system with sectorized cells and (2) a conventional base station and/or its coverage area for a system with un-sectorized cells. The terms "terminal" and "user" are used interchangeably, and the terms "sector" and "base station" are also used interchangeably. A serving base station/sector is a base station/sector with which a terminal communicates. A neighbor base station/sector is a base station/sector with which the terminal is not in communication.

The interference control techniques may also be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA. An OFDMA system utilizes orthogonal frequency division multiplexing (OFDM). OFDM, IFDMA, and LFDMA effectively partition the overall system bandwidth into multiple (K) orthogonal frequency subbands. These subbands may also be called tones, subcarriers, bins, and so on. OFDM transmits modulation symbols in the frequency domain on all or a subset of the K subbands. IFDMA transmits modulation symbols in the time domain on subbands that are uniformly distributed across the K subbands. LFDMA transmits modulation symbols in the time domain and typically on adjacent subbands.

As shown in FIG. 1 each sector may receive "desired" transmissions from terminals within the sector as well as "interfering" transmissions from terminals in other sectors. The total interference observed at each sector is composed of (1) intra-sector interference from terminals within the same sector and (2) inter-sector interference from terminals in other sectors. The inter-sector interference, which is also called other sector interference (OSI), results from the transmissions in each sector not being orthogonal to the transmissions in the other sectors. The inter-sector interference and intra-sector interference have a large impact on performance and may be mitigated as described below.

Inter-sector interference may be controlled using various mechanisms such as user-based interference control and network-based interference control. For user-based interference control, the terminals are informed of the inter-sector interference observed by the neighbor sectors and adjust their transmit powers accordingly so that the inter-sector interference is maintained within acceptable levels. For network-based interference control, each sector is informed of the inter-sector interference observed by the neighbor sectors and regulates data transmissions for its terminals such that the inter-sector interference is maintained within acceptable levels. The system may utilize only user-based interference control, or only network-based interference control, or both. The interference control mechanisms, and their combinations, may be implemented in various manners, as described below.

Figure 7:
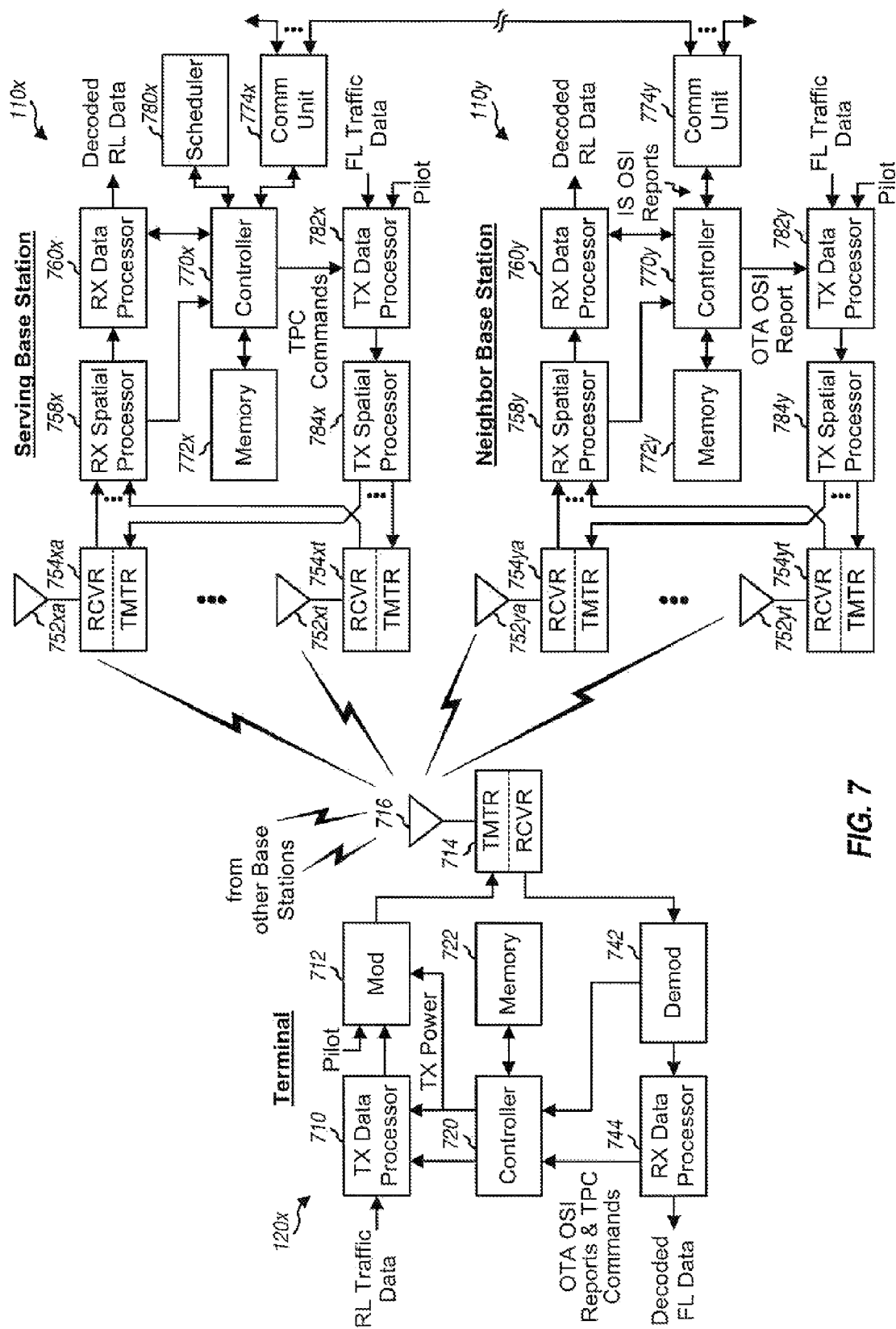
FIG. 7 shows a block diagram of an embodiment of two example base stations or access points and a terminal.
Figure 8:
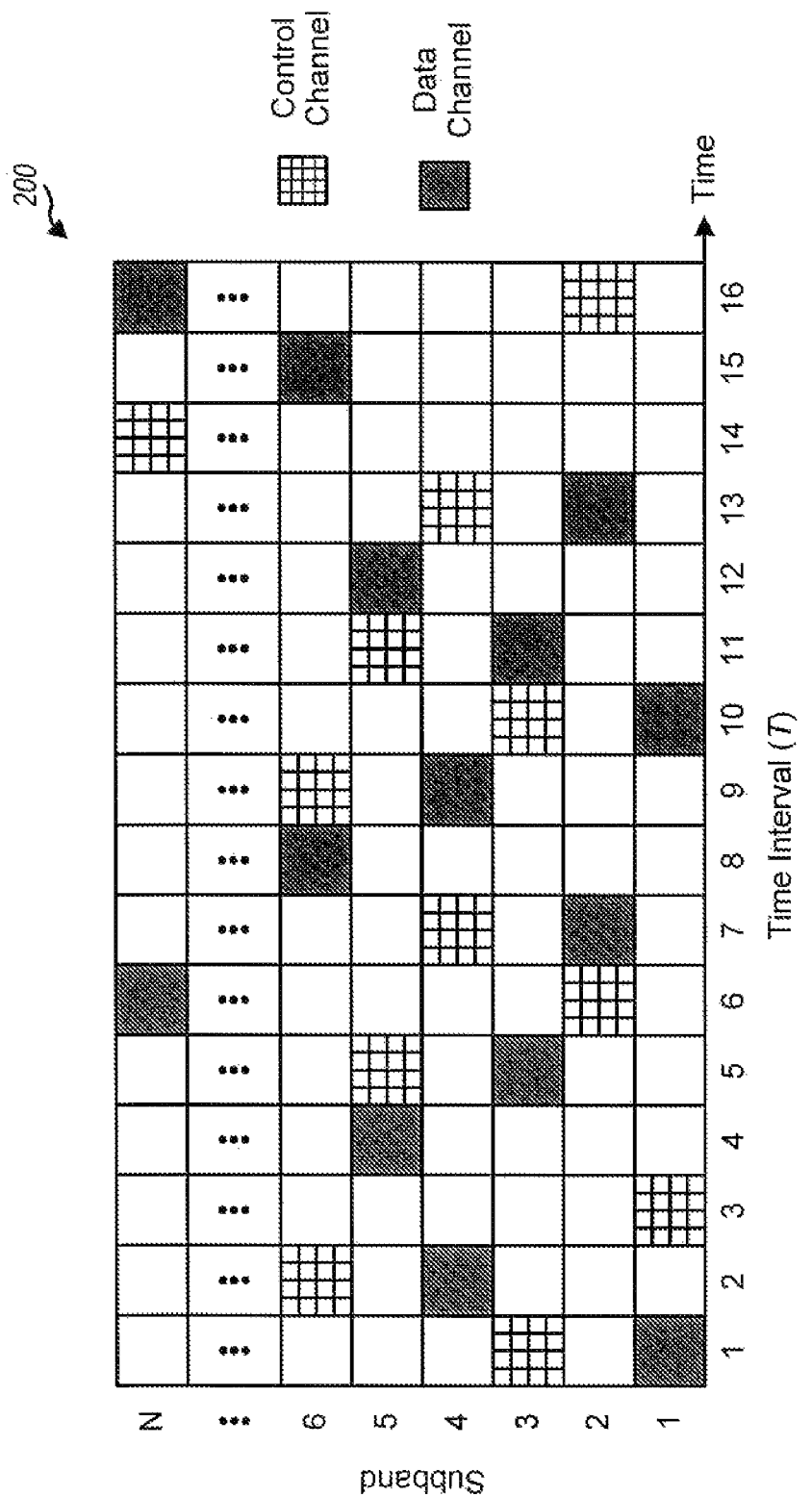
FIG. 8 shows a set of data and control channels used for the exemplary data transmission scheme.

FIG. 7 shows a block diagram of an embodiment of terminal 120x, serving base station 110x, and neighbor base station 110y. On the reverse link, at terminal 120x, a TX data processor 710 encodes, interleaves, and symbol maps reverse link (RL) traffic data and control data and provides data symbols. A modulator (Mod) 712 maps the data symbols and pilot symbols onto the proper subbands and symbol periods, performs OFDM modulation if applicable, and provides a sequence of complex-valued chips. A transmitter unit (TMTR) 714 conditions (e.g., converts to analog, amplifies, filters, and frequency upconverts) the sequence of chips and generates a reverse link signal, which is transmitted via an antenna 716.

At serving base station 110x, multiple antennas 752xa through 752xt receive the reverse link signals from terminal 120x and other terminals. Each antenna 752x provides a received signal to a respective receiver unit (RCVR) 754x. Each receiver unit 754x conditions (e.g., filters, amplifies, frequency downconverts, and digitizes) its received signal, performs OFDM demodulation if applicable, and provides received symbols. An RX spatial processor 758 performs receiver spatial processing on the received symbols from all receiver units and provides data symbol estimates, which are estimates of the transmitted data symbols. An RX data processor 760x demaps, deinterleaves, and decodes the data symbol estimates and provides decoded data for terminal 120x and other terminals currently served by base station 110x.

The processing for a forward link transmission may be performed similarly to that described above for the reverse link. The processing for the transmissions on the forward and reverse links is typically specified by the system.

For interference and power control, at serving base station 110x, RX spatial processor 758x estimates the received SNR for terminal 120x, estimates the inter-sector interference observed by base station 110x, and provides an SNR estimate for terminal 110x and an interference estimate (e.g., the measured interference $I_{meas,m}$) to a controller 770x. Controller 770x generates TPC commands for terminal 120x based on the SNR estimate for the terminal and the target SNR. Controller 770x may generate an OTA OSI report and/or an IS OSI report based on the interference estimate. Controller 770x may also receive IS OSI reports from neighbor sectors via a communication (Comm) unit 774x. The TPC commands, the OTA OSI report for base station 110x, and possibly OTA OSI reports for other sectors are processed by a TX data processor 782x and a TX spatial processor 784x, conditioned by transmitter units 754xa through 754xt, and transmitted via antennas 752xa through 752xt. The IS OSI report from base station 110x may be sent to the neighbor sectors via communication unit 774x, e.g. via a backhaul or other wired communication link.

At neighbor base station 110y, an RX spatial processor 758y estimates the inter-sector interference observed by base station 110y and provides an interference estimate to controller 770y. Controller 770y may generate an OTA OSI report and/or an IS OSI report based on the interference estimate. The OTA OSI report is processed and broadcast to the terminals in the system. The IS OSI report may be sent to the neighbor sectors via a communication unit 774y.

At terminal 120x, antenna 716 receives the forward link signals from the serving and neighbor base stations and provides a received signal to a receiver unit 714. The received signal is conditioned and digitized by receiver unit 714 and further processed by a demodulator (Demod) 742 and an RX data processor 744. Processor 744 provides the TPC commands sent by serving base station 110x for terminal 120x and the OTA OSI reports broadcast by the neighbor base stations. A channel estimator within demodulator 742 estimates the channel gain for each base station. Controller 720 detects the received TPC commands and updates the reference power level based on the TPC decisions. Controller 720 also adjusts the transmit power for the traffic channel based on the OTA OSI reports received from the neighbor base stations and the channel gains for the serving and neighbor base stations. Controller 720 provides the transmit power for the traffic channel assigned to terminal 120x. Processor 710 and/or modulator 712 scales the data symbols based on the transmit power provided by controller 720.

Controllers 720, 770x, and 770y direct the operations of various processing units at terminal 120x and base station 110x and 110y, respectively. These controllers may also perform various functions for interference and power control. Memory units 722, 772x, and 772y store data and program codes for controllers 720, 770x, and 770y, respectively. A scheduler 780x schedules terminals for communication with base station 110x and also assigns traffic channels to the scheduled terminals, e.g., based on the IS OSI reports from the neighbor base stations.

FIG. 2 illustrates frequency hopping (FH) on a time-frequency plane 200 for an OFDMA system. With frequency hopping, each traffic channel is associated with a specific FH sequence that indicates the particular subband(s) to use for that traffic channel in each time interval. The FH sequences for different traffic channels in each sector are orthogonal to one another so that no two traffic channels use the same subband in any time interval. The FH sequences for each sector are also pseudo-random with respect to the FH sequences for nearby sectors. Interference between two traffic channels in two sectors occurs whenever these two traffic channels use the same subband in the same time interval. However, the inter-sector interference is randomized due to the pseudo-random nature of the FH sequences used for different sectors.

Data channels may be assigned to active terminals such that each data channel is used by only one terminal at any given time. To conserve system resources, control channels may be shared among multiple terminals using, e.g., code division multiplexing. If the data channels are orthogonally multiplexed only in frequency and time (and not code), then they are less susceptible to loss in orthogonality due to channel conditions and receiver imperfections than the control channels.

The data channels thus have several key characteristics that are pertinent for power control. First, intra-cell interference on the data channels is minimal because of the orthogonal multiplexing in frequency and time. Second, inter-cell interference is randomized because nearby sectors use different FH sequences. The amount of inter-cell interference caused by a given terminal is determined by (1) the transmit power level used by that terminal and (2) the location of the terminal relative to the neighbor base stations.

For the data channels, power control may be performed such that each terminal is allowed to transmit at a power level that is as high as possible while keeping intra-cell and inter-cell interference to within acceptable levels. A terminal located closer to its serving base station may be allowed to transmit at a higher power level since this terminal will likely cause less interference to neighbor base stations. Conversely, a terminal located farther away from its serving base station and toward a sector edge may be allowed to transmit at a lower power level since this terminal may cause more interference to neighbor base stations. Controlling transmit power in this manner can potentially reduce the total interference observed by each base station while allowing "qualified" terminals to achieve higher SNRs and thus higher data rates.

Power control for the data channels may be performed in various manners to attain the goals noted above. For clarity, a specific embodiment of power control is described below. For this embodiment, the transmit power for a data channel for a given terminal may be expressed as:

$$P_{dch}(n) = P_{ref}(n) + \Delta P(n), \qquad \text{Eq (1)}$$

where $P_{dch}(n)$ is the transmit power for the data channel for update interval n;

$P_{ref}(n)$ is a reference power level for update interval n; and $\Delta P(n)$ is a transmit power delta for update interval n.

The power levels $P_{dch}(n)$ and $P_{ref}(n)$ and the transmit power delta $\Delta P(n)$ are given in units of decibels (dB).

The reference power level is the amount of transmit power needed to achieve a target signal quality for a designated transmission (e.g., on a control channel). Signal quality (denoted as SNR) may be quantified by a signal-to-noise ratio, a signal-to-noise-and-interference ratio, and so on. The reference power level and the target SNR may be adjusted by a power control mechanism to achieve a desired level of performance for the designated transmission, as described below. It the reference power level can achieve the target SNR, then the received SNR for the data channel may be estimated as:

$$SNR_{dch}(n) = SNR_{target} + \Delta P(n). \qquad \text{Eq (2)}$$

Equation (2) assumes that the data channel and the control channel have similar interference statistics. This is the case, for example, if the control and data channels from different sectors may interfere with one another. The reference power level may be determined as described below.

The transmit power for the data channel may be set based on various factors such as (1) the amount of inter-sector interference the terminal may be causing to other terminals in neighbor sectors, (2) the amount of intra-sector interference the terminal may be causing to other terminals in the same sector, (3) the maximum power level allowed for the terminal, and (4) possibly other factors. Each of these factors is described below.

The amount of inter-sector interference each terminal may cause may be determined in various manners. For example, the amount of inter-sector interference caused by each terminal may be directly estimated by each neighbor base station and sent to the terminal, which may then adjust its transmit power accordingly. This individualized interference reporting may require extensive overhead signaling. For simplicity, the amount of inter-sector interference each terminal may cause may be roughly estimated based on (1) the total interference observed by each neighbor base station, (2) the channel gains for the serving and neighbor base stations, and (3) the transmit power level used by the terminal. Quantities (1) and (2) are described below.

Each base station can estimate the total or average amount of interference observed by that base station. This may be achieved by estimating the interference power on each subband and computing an average interference power based on the interference power estimates for the individual subbands. The average interference power may be obtained using various averaging techniques such as, for example, arithmetic averaging, geometric averaging, SNR-based averaging, and so on.

For arithmetic averaging, the average interference power may be expressed as:

$$I_{meas,m}(n) = \frac{1}{N} \sum_{k=1}^{N} I_m(k, n), \quad \text{Eq (3)}$$

where $I_m(k,n)$ is the interference power estimate for sector m on subband k in time interval n; and
$I_{meas,m}(n)$ is the average interference power for sector m in time interval n.

The quantities $I_m(k,n)$ and $I_{meas,m}(n)$ are in linear units in equation (3) but may also be given in decibel (dB). With arithmetic averaging, a few large interference power estimates can skew the average interference power.

For geometric averaging, the average interference power may be expressed as:

$$I_{meas,m}(n) = \left( \prod_{k=1}^{N} I_m(k, n) \right)^{1/N}. \quad \text{Eq (4)}$$

Geometric averaging can suppress large interference power estimates for a few subbands, so that the average interference power is lower than with arithmetic averaging.

For SNR-based averaging, the average interference power may be expressed as:

$$\log\left(1 + \frac{P_{nom}}{I_{meas,m}(n)}\right) = \frac{1}{N} \cdot \sum_{k=1}^{N} \log\left(1 + \frac{P_{nom}}{I_m(k, n)}\right), \quad \text{Eq (5)}$$

where $P_{nom}$ denotes a nominal received power assumed for each subband. Equation (5) determines the theoretical capacity of each subband based on the nominal received power, computes the average capacity for all N subbands, and determines an average interference power that gives the average capacity. SNR-based averaging (which may also be called capacity-based averaging) also suppresses large interference power estimates for a few subbands.

Regardless of which averaging technique is used, each base station may filter the interference power estimates and/or the average interference power over multiple time intervals to improve the quality of the interference measurement. The filtering may be achieved with a finite impulse response (FIR) filter, an infinite impulses response (IIR) filter, or some other types of filter known in the art. The term "interference" may thus refer to filtered or unfiltered interference in the description herein.

Each base station may broadcast its interference measurements for use by terminals in other sectors. The interference measurements may be broadcast in various manners. In one embodiment, the average interference power (or the "measured" interference) is quantized to a predetermined number of bits, which are then sent via a broadcast channel. In another embodiment, the measured interference is broadcast using a single bit that indicates whether the measured interference is greater than or below a nominal interference threshold. In yet another embodiment, the measured interference is broadcast using two bits. One bit indicates the measured interference relative to the nominal interference threshold. The other bit may be used as a distress/panic bit that indicates whether the measured interference exceeds a high interference threshold. The interference measurements may also be sent in other manners.

For simplicity, the following description assumes the use of a single other-sector interference (OSI) bit to provide interference information. Each base station may set its OSI bit (OSIB) as follows:

$$OSIB(n) = \begin{cases} \text{'1'}, & \text{if } I_{meas,m}(n) \geq I_{target}, \text{ and} \\ \text{'0'}, & \text{if } I_{meas,m}(n) < I_{target}, \end{cases} \quad \text{Eq (6)}$$

where $I_{target}$ is the nominal interference threshold.

Alternatively, each base station may obtain a measured interference-over-thermal (IOT), which is a ratio of the total interference power observed by the base station to the thermal noise power. The total interference power may be computed as described above. The thermal noise power may be estimated by turning off the transmitter and measuring the noise at the receiver. A specific operating point may be selected for the system and denoted as $IOT_{target}$. A higher operating point allows the terminals to use higher transmit powers (on average) for the data channels. However, a very high operating point may not be desirable since the system can become interference limited, which is a situation whereby an increase in transmit power does not translate to an increase in received SNR. Furthermore, a very high operating point increases the likelihood of system instability. In any case, each base station may set its OSI bit as follows:

$$OSIB(n) = \begin{cases} \text{'1'}, & \text{if } IOT_{meas,m}(n) \geq IOT_{target}, \text{ and} \\ \text{'0'}, & \text{if } IOT_{meas,m}(n) < IOT_{target}, \end{cases} \quad \text{Eq (7)}$$

where $IOT_{meas,m}(n)$ is the measured IOT for sector m in time interval n; and
$IOT_{target}$ is the desired operating point for the sector.

For both cases, the OSI bit may be used for power control as described below.

Each terminal can estimate the channel gain (or propagation path gain) for each base station that may receive a reverse link transmission from the terminal. The channel gain for each base station may be estimated by processing a pilot received from the base station via the forward link, estimating the received pilot strength/power, and filtering pilot strength estimates over time (e.g., with a filter having a time constant of several hundred milli-seconds) to remove the effects of fast fading and so on. It all base station transmit their pilots at the same power level, then the received pilot strength for each base station is indicative of the channel gain between that base station and the terminal. The terminal may form a channel gain ratio vector, $\underline{G}$, as follows:

$$\underline{G} = [r_1(n) r_2(n) \ldots r_M(n)], \quad \text{Eq (8)}$$

$$r_i(n) = \frac{g_s(n)}{g_{ni}(n)}, \quad \text{Eq (9)}$$

where $g_s(n)$ is the channel gain between the terminal and the serving base station;

$g_{ni}(n)$ is the channel gain between the terminal and neighbor base station i; and $r_i(n)$ is the channel gain ratio for neighbor base station i.

Since distance is inversely related to channel gain, the channel gain ratio $g_s(n)/g_{ni}(n)$ may be viewed as a "relative distance" that is indicative of the distance to a neighbor base station i relative to the distance to the serving base station. In general, the channel gain ratio for a neighbor base station, $r_i(n)$, decreases as the terminal moves toward the sector edge and increases as the terminal moves closer to the serving base station. The channel gain ratio vector, $\underline{G}$, may be used for power control as described below.

Although the data channels for each sector are multiplexed such that they are orthogonal to one another, some loss in orthogonality may result from inter-carrier interference (ICI), intersymbol interference (ISI), and so on. This loss of orthogonality causes intra-sector interference. To mitigate intra-sector interference, the transmit power of each terminal may be controlled such that the amount of intra-sector interference that this terminal may cause to other terminals in the same sector is maintained within an acceptable level. This may be achieved, for example, by requiring the received SNR for the data channel for each terminal to be within a predetermined SNR range, as follows:

$$SNR_{dch}(n) \in [SNR_{min}, SNR_{max}], \quad \text{Eq (10)}$$

where $SNR_{min}$ is the minimum received SNR allowable for a data channel; and $SNR_{max}$ is the maximum received SNR allowable for a data channel.

The minimum received SNR ensures that all terminals, especially those located near the sector edge, can achieve a minimum level of performance. Without such a constraint, terminals located near the sector edge may be forced to transmit at an extremely low power level, since they often contribute a significant amount of inter-sector interference.

If the received SNRs for the data channels for all terminals are constrained to be within the range $[SNR_{min}, SNR_{max}]$, then the amount of intra-sector interference caused by each terminal due to a loss of orthogonality may be assumed to be within the acceptable level. By limiting the received SNRs to be within this SNR range, there can still be as much as $(SNR_{max} - SNR_{min})$ dB difference in received power spectral density between adjacent subbands (assuming that similar amounts of inter-sector interference are observed on the subbands, which is true, e.g., if the control and data channels hop randomly so that the control and data channels from different sectors may collide with one another). A small SNR range improves the robustness of the system in the presence of ICI and ISI. An SNR range of 10 dB has been found to provide good performance in most operating scenarios. Other SNR ranges may also be used.

If the transmit power for the data channel is determined as shown in equation (1), then the received SNR for the data channel may be maintained within the range of $[SNR_{min}, SNR_{max}]$ by constraining the transmit power delta, $\Delta P(n)$, to be within a corresponding range, as follows:

$$\Delta P(n) \in [\Delta P_{min}, \Delta P_{max}], \quad \text{Eq (11)}$$

where $\Delta P_{min}$ is the minimum transmit power delta allowable for a data channel, and $\Delta P_{max}$ is the maximum transmit power delta allowable for a data channel.

In particular, $\Delta P_{min} = SNR_{min} - SNR_{target}$ and $\Delta P_{max} = SNR_{max} - SNR_{target}$. In another embodiment, the transmit power $P_{dch}(n)$ may be constrained to be within a range that is determined, for example, based on the received signal power for the data channel. This embodiment may be used, for example, if interference power is statistically different among the subbands.

The transmit power for the data channel for each terminal may then be adjusted based on the following parameters:

The channel gain ratio vector, $\underline{G}$, computed by the terminal;

The range of received SNRs allowable for the data channels, $[SNR_{min}, SNR_{max}]$, or equivalently the range of allowable transmit power deltas, $[\Delta P_{min}, \Delta P_{max}]$; and The maximum power level, $P_{max}$, allowed for the terminal, which may set by the system or the power amplifier within the terminal.

Parameters 1) and 2) relate to the inter-sector interference caused by the terminal. Parameter 3) relates to the intra-sector interference caused by the terminal.

In general, a terminal located close to a neighbor sector that reports high interference may transmit with a lower transmit power delta so that its received SNR is closer to $SNR_{min}$. Conversely, a terminal located close to its serving base station may transmit with a higher transmit power delta so that its received SNR is closer to $SNR_{max}$. A gradation of received SNRs may be observed for the terminals in the system based on their proximity to the serving base stations. A scheduler at each base station can take advantage of the distribution of received SNRs to achieve high throughput while ensuring fairness for the terminals.

The transmit power for the data channel may be adjusted in various manners based on the four parameters noted above. The power control mechanism does not need to maintain equal SNR for all terminals, especially in an orthogonal system like an OFDMA system, where terminals closer to a base station may transmit at higher power levels without causing much problem to other terminals. For clarity, a specific embodiment for adjusting transmit power is described below. For this embodiment, each terminal monitors the OSI bits broadcast by neighbor base stations and only responds to the OSI bit of the strongest neighbor base station, which has the smallest channel gain ratio in the vector $\underline{G}$. If the OSI bit of a given base station is set to '1' (due to the base station observing higher than nominal inter-sector interference), then the transmit powers of terminals having this base station as their strongest neighbor base station may be adjusted downward.

Conversely, if the OSI bit is set to '0', then the transmit powers of terminals having this base station as their strongest neighbor base station may be adjusted upward. For other embodiments, each terminal may adjust its transmit power based on one or multiple OSI bits obtained for one or multiple base stations (e.g., serving and/or neighbor base stations).

The OSI bit thus determines the direction in which to adjust the transmit power. The amount of transmit power adjustment for each terminal may be dependent on (1) the current transmit power level (or the current transmit power delta) of the terminal and (2) the channel gain ratio for the strongest neighbor base station. Table 1 lists some general rules for adjusting the transmit power based on the transmit power delta and the channel gain ratio for the strongest base station.

TABLE 1

| OSI Bit | Transmit Power Adjustment |
| --- | --- |
| '1' (high interference level) | A terminal with a smaller channel gain ratio for (and is thus closer to) the base station transmitting the OSI bit, in general, decreases its transmit power delta by a larger amount in comparison to a terminal with a larger channel gain ratio for (and is thus farther away from) this base station. A terminal with a larger transmit power delta, in general, decreases its transmit power delta by a larger amount in comparison to a terminal with a similar channel gain ratio for this base station but a smaller transmit power delta. |
| '0' (low interference level) | A terminal with a larger channel gain ratio for (and is thus farther away from) the base station transmitting the OSI bit, in general, increases its transmit power delta by a larger amount in comparison to a terminal with a smaller channel gain ratio for (and is thus closer to) this base station. A terminal with a smaller transmit power delta, in general, increases its transmit power delta by a larger amount in comparison to a terminal with a similar channel gain ratio for this base station but a larger transmit power delta. |

The transmit power may be adjusted in a deterministic manner, a probabilistic manner, or some other manner. For deterministic adjustment, the transmit power is adjusted in a pre-defined manner based on the pertinent parameters. For probabilistic adjustment, the transmit power has a certain probability of being adjusted, with the probability being determined by the pertinent parameters. Exemplary deterministic and probabilistic adjustment schemes are described below.

Figure 9:
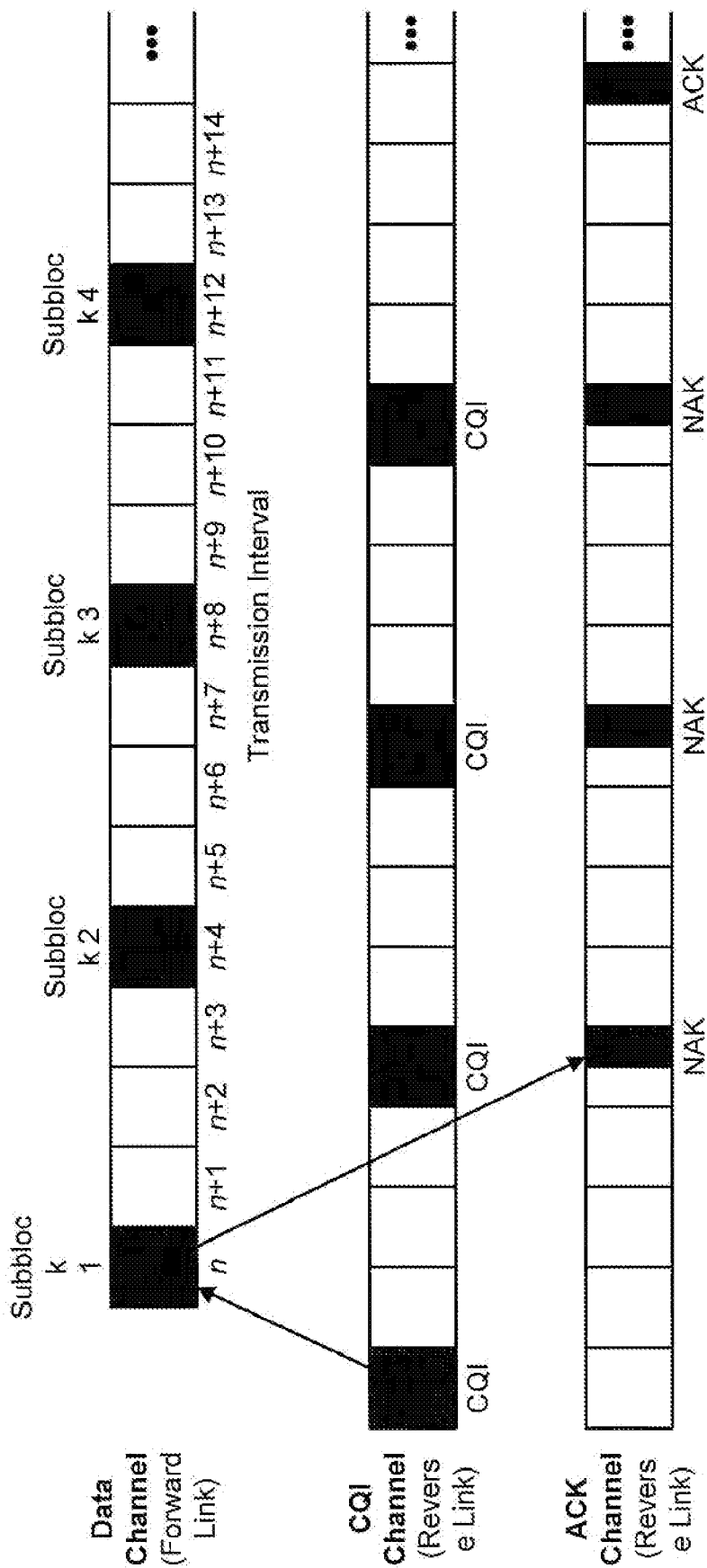
FIG. 9 shows a set of data and control channels for a data transmission scheme.

Reverse link loading of an OFDM or OFDMA system can be measured as follows. FIG. 9 shows a set of data and control channels used for the exemplary data transmission scheme. The terminal measures the received signal quality of the forward link and transmits a channel quality indicator (CQI) codeword on the CQI channel. The terminal continually makes measurements of the forward link quality and sends updated CQI codewords on the CQI channel. Thus, discarding received CQI codewords deemed to be erased is not detrimental to system performance. However, received CQI codewords deemed to be non-erased should be of high quality since a forward link transmission may be scheduled based on the information contained in these non-erased CQI codewords.

If the terminal is scheduled for forward link transmission, then the serving base station processes data packets to obtain coded packets and transmits the coded packets on a forward link data channel to the terminal. For a hybrid automatic retransmission (H-ARQ) scheme, each coded packet is partitioned into multiple subblocks, and one subblock is transmitted at a time for the coded packet. As each subblock for a given coded packet is received on the forward link data channel, the terminal attempts to decode and recover the packet based on all subblocks received thus far for the packet. The terminal is able to recover the packet based on a partial transmission because the subblocks contain redundant information that is useful for decoding when the received signal quality is poor but may not be needed when the received signal quality is good. The terminal then transmits an acknowledgment (ACK) on an ACK channel if the packet is decoded correctly, or a negative acknowledgment (NAK) otherwise. The forward link transmission continues in this manner until all coded packets are transmitted to the terminal.

The loading in the reverse link of a cellular system is a function of the total interference power seen at the base station and the receiver noise floor (when there is no interference) at the base station. The source of this interference may be users from within the same sector (intra-sector interference) or users from adjacent sectors (inter-sector interference).

In a CDMA system that uses matched filter receivers (also known as Rake receivers) the total interference power is the total received power that comprises the intra-sector interference power, inter-sector interference and the receiver noise power. In a CDMA system that uses interference cancellation techniques, the total interference power is less than the total received power. More specifically, the total interference power is the total received power minus the cancelled interference power.

In an orthogonal multiple access system (such as OFDMA, TDMA, FDMA), the total interference power is less than the total received power. More specifically, the total interference power is the total received power minus the power from users in the same sector that are orthogonal to the desired user's signal. So, as an example, in an OFDMA system, the total interference power is the inter-sector interference power plus receiver noise power. As suggested, the loading is a function of both the total interference power and the receiver noise power. A mechanism is provided for measuring the receiver noise power and the total interference power.

A method as described above for measuring receiver noise power can be used in an OFDM or OFDMA system. A silence interval is specified. Remote terminals do not transmit during this silence interval. The silence interval is an interval in time and frequency. As an example, for an OFDMA (or FDMA) system, the silence interval may last from time t1 to time t2, and span from frequency f1 to frequency f2. Multiple silence intervals may be used (spanning different time/frequency blocks) to improve the estimation accuracy. The silence frequencies may be generated using a notch filter as explained above or by nulling out certain tones of the IFFt/FFT output used for OFDMA or FDMA transmissions.

Another example way of measuring receiver noise is by measuring any signal existing in a guard band. A guard band is any unused tones; each unused tone in a guard band is called a guard tone. For example, a communication system may include unused tones between an uplink band and a downlink band, or between any two communication bands. Receiver noise can be measured in at least one guard tone.

As another example, the receiver noise may be measured in disjoint tones. That is, the tones used for the receiver noise measurement need not be adjacent to each other.

Several schemes are possible for estimating interference. Any convenient scheme can be used. As an example, for an OFDMA or FDMA system, each remote terminal transmits some pilots along with the data. In one embodiment, the base station (or access point) takes the difference of pairs of pilot symbols that are contiguous to each other in time or frequency. It then averages the power of the resulting signal.

As another example, null transmissions can be used. That is, some frequency carriers for a certain duration are not used in the particular sector but are used in adjacent sectors. One such method would be to use some pseudo-random mechanism for choosing the carriers and time duration that are left unused in a particular sector. Then, the energy on those carriers over that time duration is equal to the total interference power.

The measured loading value can be used for power control (as described, for example, in U.S. patent application Ser. No. 10/897,463, entitled "POWER CONTROL FOR A WIRELESS COMMUNICATION SYSTEM UTILIZING ORTHORGONAL MULTIPLEXING", filed on Jul. 22, 2004, and assigned to the assignee of the present application, and which is hereby incorporated by reference herein), for admission control, rate control or for other diagnostic purposes, including as described above.

The terminal does not transmit during the specified silence interval which is a set of time and frequency slots. A notch filter may be used to create the time and frequency slots. Another mechanism is to null out certain tones of FFT/IFFT output in an OFDMA/FDMA transmitter.

Figure 10:
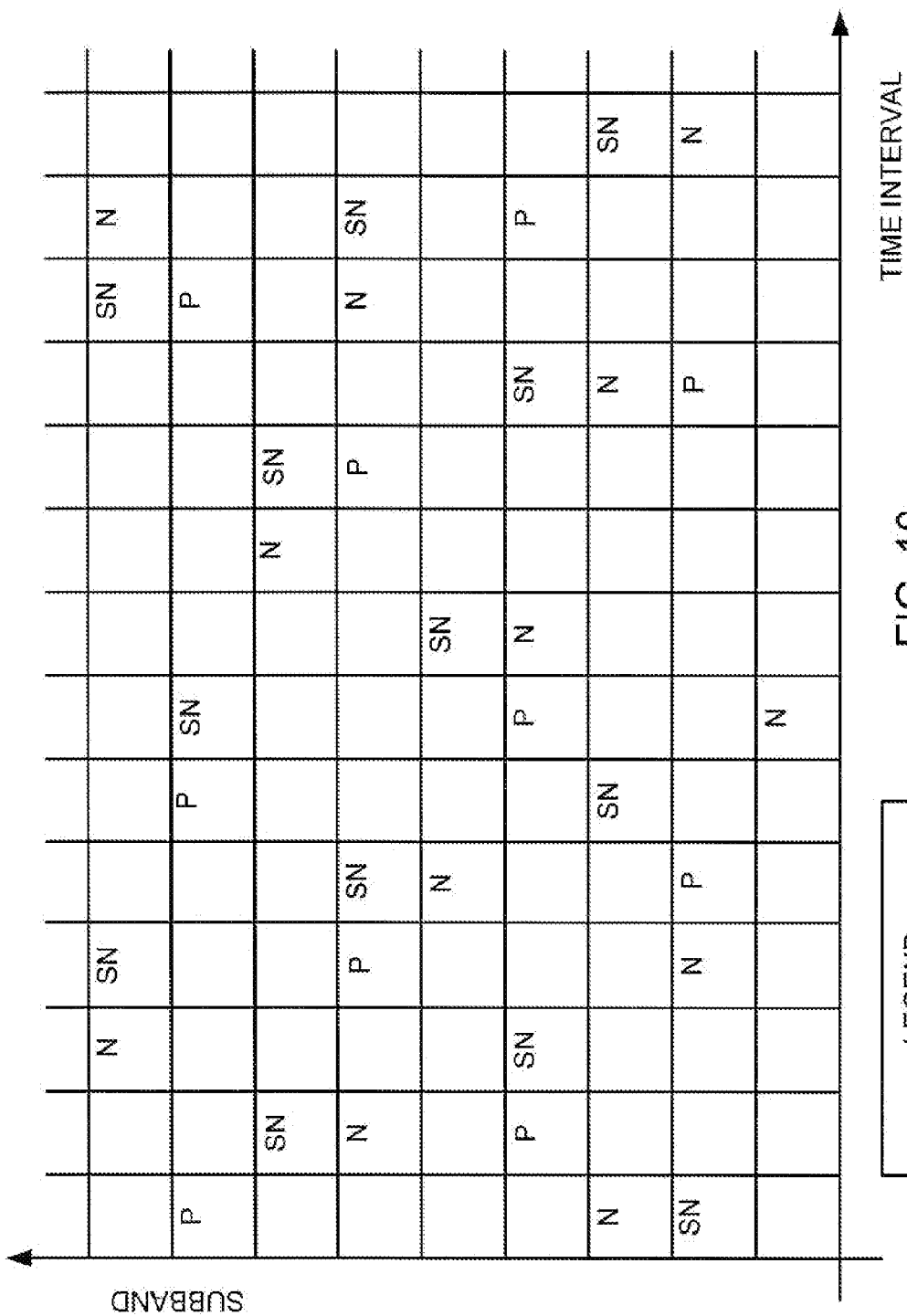
FIG. 10 is an illustration of a plot of time versus frequency illustrating pilot symbols and sector null symbols.

FIG. 10 is a plot illustrating communication frequency 1011 in tones or subbands, plotted against time 1015 in time intervals or OFDM symbols with several pilot and null tones. Pilot tone symbols are shown as P 1019. Sector null tone symbols are shown as SN 1023. Null tone symbols are shown as N 1027. As described above, interference from adjacent sectors can be measured during sector nulls 1023.

Figure 11:
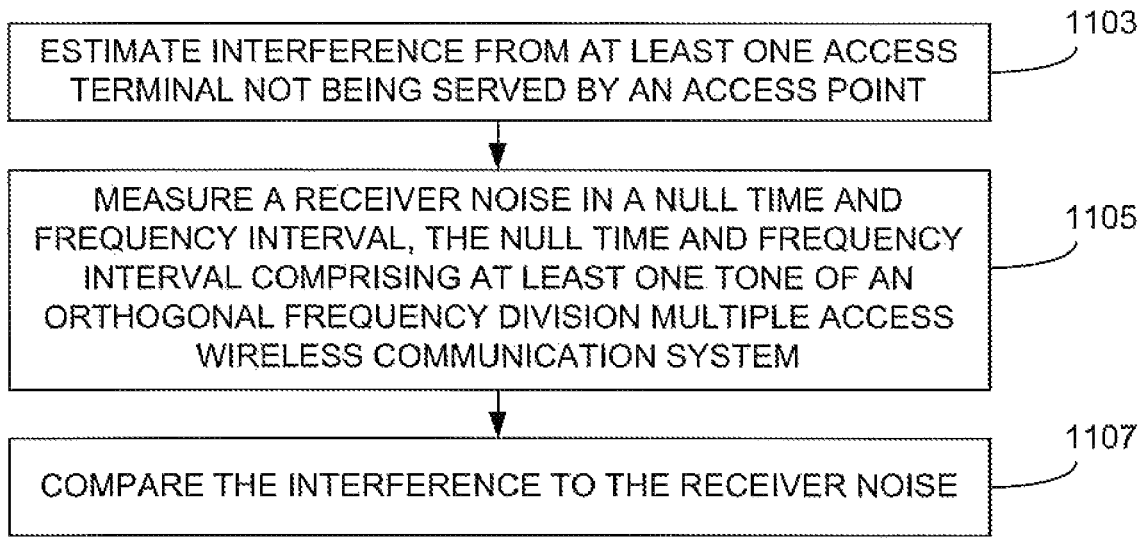
FIG. 11 is a flow diagram illustrating a method of calculating a reverse link loading in an orthogonal frequency division multiple access wireless communication system.

FIG. 11 is a flow diagram illustrating a method of calculating a reverse link loading in an orthogonal frequency division multiple access wireless communication system. The method starts at step 1103. In step 1103, interference is estimated from at least one access terminal not being served by an access point. In step 1105, a receiver noise is measured in a null time and frequency interval, the null time and frequency interval including at least one tone of the orthogonal frequency division multiple access wireless communication system. In step 1107, the interference is compared to the receiver noise. Measuring step 1105 may include measuring a first received power outside the null time and frequency interval.

Estimating step 1103 may include measuring a second received power in the null time and frequency interval. The transmission power may be increased responsive to the comparing. Alternatively, an admission request may be denied responsive to the comparing. As a further alternative, a data rate may be decreased responsive to the comparing.

Comparing step 1107 may include dividing the interference by the receiver noise. Estimating step 1103 may include detecting a first pilot signal, detecting a second pilot signal, and subtracting the first pilot signal from the second pilot signal.

Alternatively, measuring step 1105 may include measuring receiver noise in a guard band, in any type of communication system.

Figure 12:
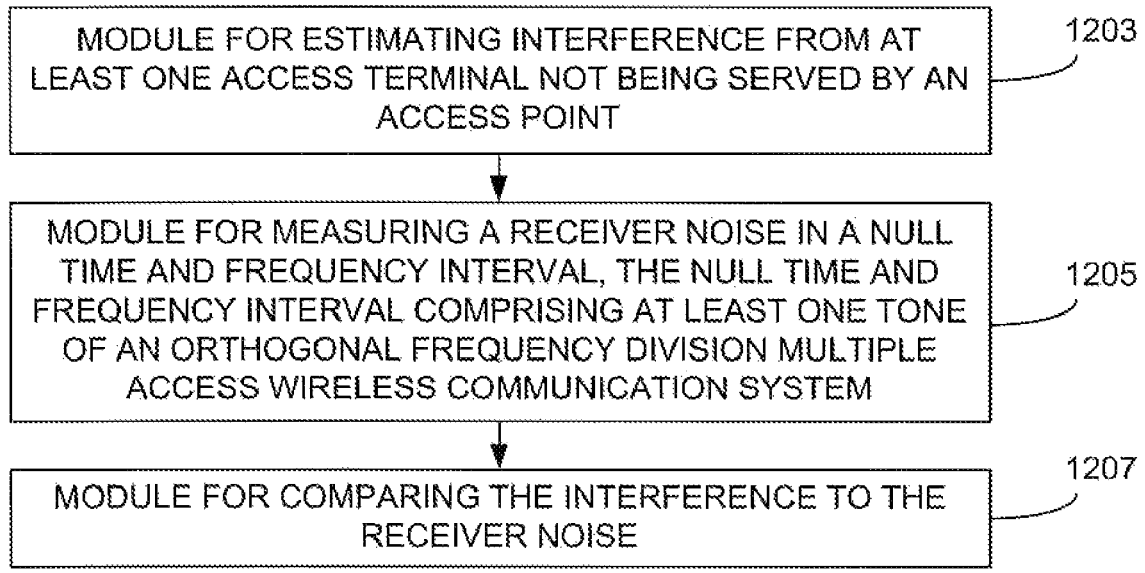
FIG. 12 is a block diagram of illustrating part of a wireless communication device capable of calculating a reverse link loading in an orthogonal frequency division multiple access wireless communication system.

FIG. 12 is a block diagram of illustrating part of a wireless communication device capable of calculating a reverse link loading in an orthogonal frequency division multiple access wireless communication system. In module 1203, interference is estimated from at least one access terminal not being served by an access point. In module 1205, a receiver noise is measured in a null time and frequency interval, the null time and frequency interval including at least one tone of the orthogonal frequency division multiple access wireless communication system. In module 1207, the interference is compared to the receiver noise. Measuring module 1205 may include measuring a first received power outside the null time and frequency interval.

Estimating module 1203 may include measuring a second received power in the null time and frequency interval. The transmission power may be increased responsive to the comparing. Alternatively, an admission request may be denied responsive to the comparing. As a further alternative, a data rate may be decreased responsive to the comparing.

Comparing module 1207 may include dividing the interference by the receiver noise. Estimating module 1203 may include detecting a first pilot signal, detecting a second pilot signal, and subtracting the first pilot signal from the second pilot signal.

Alternatively, measuring module 1205 may include measuring receiver noise in a guard band, in any type of communication system.

The techniques described herein may be implemented by various means. For example, these techniques may be implemented in hardware, software, or a combination thereof. For a hardware implementation, the processing units used to perform erasure detection and/or power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 572 in FIG. 5) and executed by a processor (e.g., controller 570). The memory unit may be implemented within the processor or external to the processor, in which case it can be communicatively coupled to the processor via various means as is known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of calculating a reverse link loading in an orthogonal frequency division multiple access wireless communication system, the method comprising:
   estimating, at an access point, interference from at least one access terminal not being served by the access point, wherein estimating interference comprises:
   detecting a first pilot signal;
   detecting a second pilot signal that is contiguous to the first pilot signal in time or frequency; and
   subtracting the first pilot signal from the second pilot signal;
   measuring a receiver noise in a null time and frequency interval, the null time and frequency interval comprising at least one tone of the orthogonal frequency division multiple access wireless communication system; and
comparing the interference to the receiver noise.

2. The method of claim 1, wherein the estimating interference comprises:
measuring a second received power in the null time and frequency interval.

3. The method of claim 1, further comprising:
increasing transmission power responsive to the comparing.

4. The method of claim 1, further comprising:
denying an admission request responsive to the comparing.

5. The method of claim 1, further comprising:
decreasing a data rate responsive to the comparing.

6. The method of claim 1, wherein the comparing comprises dividing the interference by the receiver noise.

7. A method of calculating a reverse link loading in a wireless communication system, the method comprising:
estimating, at an access point, interference from at least one access terminal not being served by the access point, wherein estimating interference comprises:
detecting a first pilot signal;
detecting a second pilot signal that is contiguous to the first pilot signal in time or frequency; and
subtracting the first pilot signal from the second pilot signal;
measuring a receiver noise in a null time and frequency interval in a guard band; and
comparing the interference to the receiver noise.

8. A wireless communication device operable in an orthogonal frequency division multiple access wireless communication system, the wireless communication device comprising:
a processor configured to:
estimate, at the wireless communication device, interference from at least one access terminal not being served by the wireless communication device, wherein estimating interference comprises:
detecting a first pilot signal;
detecting a second pilot signal that is contiguous to the first pilot signal in time or frequency; and
subtracting the first pilot signal from the second pilot signal;
measure a receiver noise in a null time and frequency interval, the null time and frequency interval comprising at least one tone of the orthogonal frequency division multiple access wireless communication system; and
compare the interference to the receiver noise; and
a transmitter coupled to the processor and configured to transmit wireless communication signals to a plurality of wireless communication access terminals.

9. The wireless communication device of claim 8, wherein the processor is configured to:
measure a second received power in the null time and frequency interval.

10. The wireless communication device of claim 8, wherein the processor is configured to:
increase transmission power responsive to the comparing.

11. The wireless communication device of claim 8, wherein the processor is configured to:
deny an admission request responsive to the comparing.

12. The wireless communication device of claim 8, wherein the processor is configured to:
decrease a data rate responsive to the comparing.

13. The wireless communication device of claim 8, wherein the processor is configured to:
divide the interference by the receiver noise.

14. The method of claim 1, wherein the measuring comprises:
measuring a first received power outside the null time and frequency interval.

15. The wireless communication device of claim 8, wherein the processor is configured to:
measure a first received power outside a null time and frequency interval.

16. A wireless communication device comprising:
a processor configured to:
estimate, at the wireless communication device, interference from at least one access terminal not being served by the wireless communication device, wherein estimating interference comprises:
detecting a first pilot signal;
detecting a second pilot signal that is contiguous to the first pilot signal in time or frequency; and
subtracting the first pilot signal from the second pilot signal;
measure a receiver noise in a guard band; and
compare the interference to the receiver noise; and
a transmitter coupled to the processor and configured to transmit wireless communication signals to a plurality of wireless communication access terminals.

17. A wireless communication device operable in an orthogonal frequency division multiple access wireless communication system, the wireless communication device comprising:
a processing means for estimating, at the wireless communication device, interference from at least one access terminal not being served by the wireless communication device, wherein estimating interference comprises:
detecting a first pilot signal;
detecting a second pilot signal that is contiguous to the first pilot signal in time or frequency; and
subtracting the first pilot signal from the second pilot signal;
a measuring means for measuring a receiver noise in a null time and frequency interval, the null time and frequency interval comprising at least one tone of the orthogonal frequency division multiple access wireless communication system;
a comparing means for comparing the interference to the receiver noise; and
a transmitting means for transmitting wireless communication signals to a plurality of wireless communication access terminals, the transmitting means being coupled to the processing means.

18. The wireless communication device of claim 17, wherein the processing means further comprises:
a null time and frequency measuring means for measuring a second received power in the null time and frequency interval.

19. The wireless communication device of claim 17, wherein the processing means is configured to:
increase transmission power responsive to the comparing.

20. The wireless communication device of claim 17, wherein the processing means is configured to:
deny an admission request responsive to the comparing.

21. The wireless communication device of claim 17, wherein the processing means is configured to:
decrease a data rate responsive to the comparing.

22. The wireless communication device of claim 17, wherein the processing means is configured to:
   divide the interference by the receiver noise.
23. The wireless communication device of claim 17, wherein the processing means further comprises:
   a non-null time and frequency measuring means for measuring a first received power outside a null time and frequency interval.
24. A machine-readable medium having stored thereon instructions, which, when executed by a machine, cause the machine to:
   estimate, at an access point, interference from at least one access terminal not being served by the access point, wherein estimating interference comprises detecting a first pilot signal;
      detecting a second pilot signal that is contiguous to the first pilot signal in time or frequency; and
      subtracting the first pilot signal from the second pilot signal;
   measure a receiver noise in a null time and frequency interval, the null time and frequency interval comprising at least one tone of an orthogonal frequency division multiple access wireless communication system; and
   compare the interference to the receiver noise.

25. The machine-readable medium of claim 24, wherein the estimating interference comprises:
   measuring a second received power in the null time and frequency interval.
26. A machine-readable medium as in claim 24 further comprising instructions that are executable to increase transmission power responsive to the comparing.
27. A machine-readable medium as in claim 24 further comprising instructions that are executable to deny an admission request responsive to the comparing.
28. A machine-readable medium as in claim 24 further comprising instructions that are executable to decrease a data rate responsive to the comparing.
29. The machine-readable medium of claim 24, wherein the comparing comprises dividing the interference by the receiver noise.
30. The machine-readable medium of claim 24, wherein the measuring comprises:
   measuring a first received power outside a null time and frequency interval.

* * * * *